(12) United States Patent
Grupp et al.

(10) Patent No.: US 12,085,898 B2
(45) Date of Patent: *Sep. 10, 2024

(54) ILLUMINATED TIME-PASSAGE INDICATOR

(71) Applicants: Daniel Grupp, Portland, OR (US); Kristi Yuthas, Portland, OR (US)

(72) Inventors: Daniel Grupp, Portland, OR (US); Kristi Yuthas, Portland, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/047,416

(22) Filed: Oct. 18, 2022

(65) Prior Publication Data
US 2023/0068736 A1    Mar. 2, 2023

Related U.S. Application Data

(63) Continuation of application No. 16/796,702, filed on Feb. 20, 2020, now Pat. No. 11,507,027.

(60) Provisional application No. 62/810,246, filed on Feb. 25, 2019.

(51) Int. Cl.
| | |
|---|---|
| G04G 9/04 | (2006.01) |
| G04F 10/00 | (2006.01) |
| G06F 3/041 | (2006.01) |
| G06F 3/044 | (2006.01) |

(52) U.S. Cl.
CPC .............. *G04F 10/00* (2013.01); *G04G 9/04* (2013.01); *G06F 3/0416* (2013.01); *G06F 3/044* (2013.01)

(58) Field of Classification Search
CPC .............. G04G 9/02; G04G 9/04; G04G 9/06; G04B 45/00; G04B 19/00; G04B 19/30; G04F 10/00
See application file for complete search history.

(56) References Cited

U.S. PATENT DOCUMENTS

| | | | |
|---|---|---|---|
| 3,574,992 A | | 4/1971 | Ladas |
| 3,757,511 A | * | 9/1973 | Burgess .................. H01L 33/00 257/E27.128 |
| 3,775,964 A | | 12/1973 | Fukumoto |
| 3,918,052 A | | 11/1975 | Bricher |
| 5,526,327 A | | 6/1996 | Cordova, Jr. |
| 5,662,473 A | | 9/1997 | Rassoli et al. |

(Continued)

FOREIGN PATENT DOCUMENTS

| | | |
|---|---|---|
| FR | 1059452 A | 3/1954 |
| GB | 2323688 A | 9/1998 |

(Continued)

*Primary Examiner* — Reginald S Tillman, Jr.
(74) *Attorney, Agent, or Firm* — Jackrel Consulting, Inc.; David Jackrel; Ashley Sloat

(57) ABSTRACT

A time-passage indicator device can comprise a housing, a plurality of light elements coupled to the housing, a window comprising an inner surface and an outer surface, and a processor that controls the plurality of light elements. The window can be attached to the housing and diffuse or scatter light emitted from the plurality of light elements. The light elements can emit the light through the window to form an illuminated region. The processor can control the light elements such that the illuminated region changes to indicate the passage of time. The illuminated region can have a minimum viewing angle from 0 degrees to 20 degrees, where the minimum viewing angle of 0 degrees is measured from a plane of the base surface.

21 Claims, 14 Drawing Sheets

(56) References Cited

U.S. PATENT DOCUMENTS

| | | |
|---|---|---|
| 6,198,698 B1 | 3/2001 | Graves |
| 7,330,130 B2 | 2/2008 | Bolotin et al. |
| 7,773,464 B2 | 8/2010 | Rogers |
| D830,858 S | 10/2018 | Rogers et al. |
| 11,507,027 B2 * | 11/2022 | Grupp ..................... G07C 1/08 |
| 2003/0174586 A1 | 9/2003 | Hon et al. |
| 2006/0062089 A1 | 3/2006 | Lizzi |
| 2008/0253234 A1 | 10/2008 | Rogers |
| 2009/0154298 A1 | 6/2009 | Taylor et al. |
| 2011/0182151 A1 | 7/2011 | Geyer et al. |

FOREIGN PATENT DOCUMENTS

| | | |
|---|---|---|
| WO | 9100554 A1 | 1/1991 |
| WO | 2019087104 A2 | 5/2019 |

* cited by examiner

ILLUMINATED TIME-PASSAGE INDICATOR

RELATED APPLICATIONS

This application is a continuation of U.S. patent application Ser. No. 16/796,702, filed on Feb. 20, 2020, and entitled "Illuminated Time-Passage Indicator," which claims the benefit of U.S. Provisional Patent Application No. 62/810,246 filed on Feb. 25, 2019, and entitled "Time-passage indicator," which is hereby incorporated by reference for all purposes.

BACKGROUND

It has become increasingly difficult to keep track of time despite the increased presence of digital technology. It has become a trend to design office spaces without clocks, especially in meeting rooms, where clocks have for the most part disappeared. Wrist watches are less common as well. The clock we depend on tends to be in our pocket or on our phones. There are many situations where we are socially limited from checking the time, such as during a meeting. We have apps that can create audio alerts at a given time, but these are also often socially inappropriate, and they tend to indicate when we are out of time, without warning. Further, we are highly scheduled, yet we don't have an easy way to keep track of our schedule, especially during tasks. For example, we may check an online calendar while at our desks, and we can see the clock in the corner of a computer screen, but to stay on schedule requires us to continually keep in mind the parameters of our schedule and to do the mental calculations to keep that information in our heads (e.g., to compute with a glance at the digital clock how much time we have before the next event). This is possible, but is challenging and takes mental effort that could be spent elsewhere. Additionally, most of our time keeping devices indicate what time it is rather than the passage of time. The ability to view time passing in an intuitive way is needed. Also lacking is the ability to have a shared sense of time passing.

SUMMARY

In some embodiments, a time-passage indicator comprises a housing, a plurality of light elements located inside the housing, a window comprising an inner and an outer surface, a touch sensor, and a processor that controls the plurality of light elements based upon signals from the touch sensor. The housing can comprise a base surface on one side and a second surface on the opposite side. The window can be attached to the second surface of the housing and diffuse or scatter the light from the plurality of light elements. The touch sensor can comprise an optically transmissive element located proximal to a surface of the window. The light elements can emit light through the window forming an illuminated region viewable by a user. The processor can control the light elements such that the illuminated region changes to indicate the passage of time. The illuminated region can be viewable from all angles between 10 degrees and 90 degrees, where the angle 10 degrees is measured from a plane of the base surface, and the angle of 90 degrees corresponds to a normal viewing angle.

In some embodiments, a time-passage indicator comprises a housing, a plurality of light elements located inside the housing, a window comprising an inner and an outer surface, and a processor that controls the plurality of light elements. The housing can comprise a base surface on one side and a second surface on the opposite side. The window can be attached to the second surface of the housing and diffuses or scatters the light from the plurality of light elements. The light elements can emit light through the window to form an illuminated region viewable by a user. In this device, the processor can control the light elements such that the illuminated region changes to indicate the passage of time according to a timing mode that is selectable to be a fixed timing mode or a variable timing mode. The illuminated region can be viewable from all angles between 10 degrees and 90 degrees, where the angle 10 degrees is measured from a plane of the base surface, and the angle of 90 degrees corresponds to a normal viewing angle.

In some embodiments, a time-passage indicator comprises a housing, a plurality of light elements located inside the housing, a window comprising an inner and an outer surface, and a processor located inside the housing that controls the plurality of light elements. The housing can comprise a base surface on one side and a second surface on the opposite side. In this device, the window is attached to the second surface of the housing, the window protrudes from the housing, and the window diffuses or scatters the light from the plurality of light elements. The light elements can emit light through the window to form an illuminated region viewable by a user. The processor can control the light elements such that the illuminated region changes to indicate the passage of time, and the illuminated region is viewable from all angles between 10 degrees and 90 degrees, where the angle 10 degrees is measured from a plane of the base surface, and the angle of 90 degrees corresponds to a normal viewing angle.

In some embodiments, a network of time-passage indicators comprises two or more time-passage indicators. A first time-passage indicator in the network of time-passage indicators can comprise a housing, a plurality of light elements located inside the housing, a window comprising an inner and an outer surface, a processor that controls the plurality of light elements, and wireless communication electronics. The housing can comprise a base surface on one side and a second surface on the opposite side. The window can be attached to the second surface of the housing and diffuses or scatters the light from the plurality of light elements. The light elements can emit light through the window to form an illuminated region viewable by a user. The processor can controls the light elements such that the illuminated region changes to indicate the passage of time, and the illuminated region is viewable from all angles between 10 degrees and 90 degrees, where the angle 10 degrees is measured from a plane of the base surface, and the angle of 90 degrees corresponds to a normal viewing angle. The processor of the first time-passage indicator can communicate with a second time-passage indicator in the network of time-passage indicators using the wireless communication electronics, and a user input provided to the first time-passage indicator that causes a first timer parameter to be set in the first time-passage indicator also causes a second timer parameter to be set in the second time-passage indicator.

In some embodiments, a time-passage indicator comprises: a housing comprising a base surface on one side and a second surface on an opposite side; a plurality of light elements coupled to the housing; a window comprising an inner surface and an outer surface; and a processor that controls the plurality of light elements. The window can be attached to the second surface of the housing and diffuse or scatter light emitted from the plurality of light elements. The plurality of light elements can emit the light through the window to form an illuminated region. The processor can control the plurality of light elements such that the illuminated region changes to indicate a passage of time. A minimum viewing angle of the illuminated region can be from 0 degrees to 20 degrees, where the minimum viewing angle of 0 degrees is measured from a plane of the base surface.

In some embodiments, a network of time-passage indicators comprises two or more time-passage indicators. A first time-passage indicator in the network of time-passage indicators can comprise: a housing comprising a base surface on one side and a second surface on the opposite side; a plurality of light elements coupled to the housing; a window comprising an inner and an outer surface; a processor that controls the plurality of light elements; and wired or wireless communication electronics. The window can be attached to the second surface of the housing and diffuse or scatter light from the plurality of light elements. The plurality of light elements can emit light through the window to form an illuminated region. The processor can control the plurality of light elements such that the illuminated region changes to indicate a passage of time. A minimum viewing angle of the illuminated region can be from 0 degrees to 20 degrees, where the minimum viewing angle of 0 degrees is measured from a plane of the base surface. The processor of the first time-passage indicator can communicate with a second time-passage indicator in the network of time-passage indicators using the wired or wireless communication electronics. The first time-passage indicator can receive a user input that causes a first timer parameter to be set in the first time-passage indicator and a second timer parameter to be set in the second time-passage indicator.

DETAILED DESCRIPTION

Figure 1A:
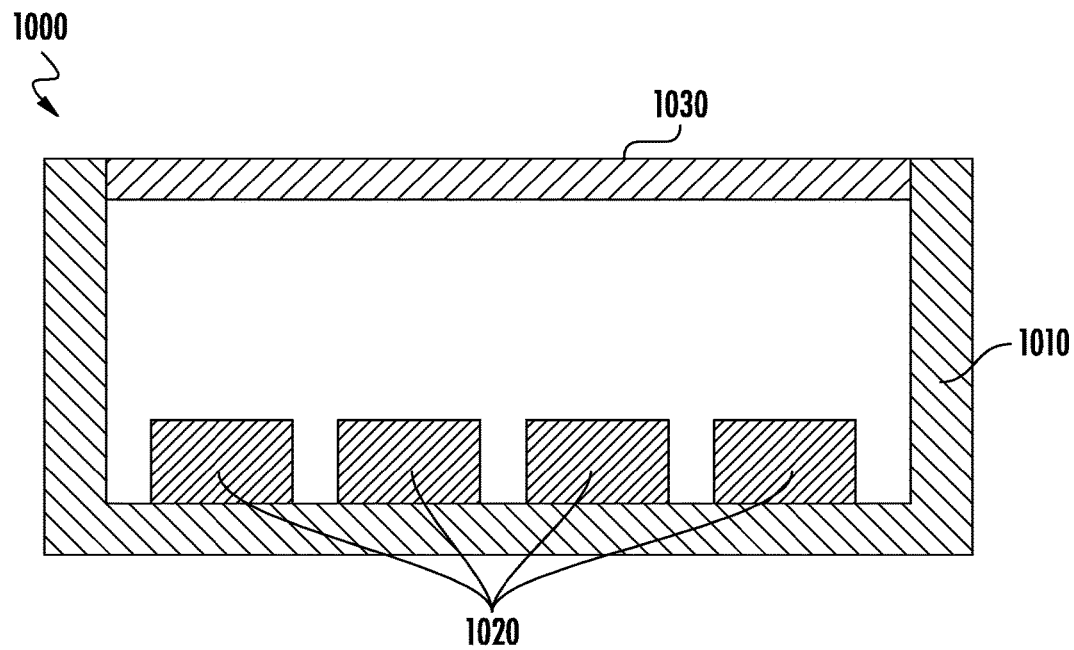
FIG. 1A shows an example of a time-passage indicator, in cross-section view, in accordance with some embodiments.

A time-passage indicator system and methods for use are described herein. The present time-passage indicator contains light elements that emit light onto and through a window to form an illuminated region generally on the surface of the window viewable by a user. The time-passage indicator may have a single window or multiple windows. The time-passage indicator contains a processor (e.g., microprocessor, or microcontroller) that controls the light elements such that the illuminated region changes to indicate the passage of time. In some embodiments, the window also diffuses or scatters the light and the illuminated region is viewable from a wide range of angles.

The present time-passage indicator system and methods allow a user to interact with time in ways that are fast and simple, and communicate to a user exactly what the user needs to know about where the user is in time and within the user's schedule. The present system and methods satisfy the criteria of being seamlessly integrated with modern digital life, being easy to use, and presenting the information a user, or a group of users, needs to manage themselves in time.

A device and method for displaying a preset amount of time are described. In some embodiments, the devices contains a display that consists of an illuminated region where the region illuminated increases or decreases in length over time. In some embodiments, the display may be visible from many angles, or all angles, in a complete sphere around it. The present devices can also interface with other digital devices to allow easy, customizable, and rapid configuration of the present devices. The device may also include a touch sensor and be settable by touching a surface of the device, in some embodiments. The touch sensor can form regions that can be activated by human touch such as by a finger where the touch-sensitive regions are coincident with the illuminated regions.

In some embodiments, the time-passage indicator contains a touch sensor that communicates a user input to the processor. In some embodiments, the processor of the time-passage indicator controls the light elements such that the illuminated region changes to indicate the passage of time according to a timing mode that is selectable to be a fixed timing mode or a variable timing mode. In some embodiments, the window of the time-passage indicator protrudes from a housing that contains the light elements.

In some embodiments, a time-passage indicator is a member of a network of time-passage indicators, and the time-passage indicator communicates wirelessly with other devices on the network. In some embodiments, the processor controls the plurality of light elements based upon signals from various wireless inputs. In some embodiments, a time-passage indicator in a network can communicate with other time-passage indicators in the network. For example, a user input can be provided to a first time-passage indicator that causes a first timer parameter to be set in the first time-passage indicator and also causes a second timer parameter to be set in a second time-passage indicator that is on the same network as the first time-passage indicator. Other parameters may be set between time-passage indicators as well. The parameters sent can be the same such that two or more time-passage indicators have the same settings, for example such that multiple time-passage indicators display the same passage of time. The parameters sent may also result in different settings of the receiving time-passage indicators. For example, a second time-passage indicator may be set to display a passage of a time shorter than the first time-passage indicator by some fixed predetermined relationship. Other parameters such as brightness may also be different between different devices on the network, and may also have predetermined relationships.

In some embodiments, a time-passage indicator includes a housing with a light source located inside the housing, and a window comprising an inner and an outer surface, wherein the window is attached to the housing. The light source of the present time-passage indicator device emits light through the window to form an illuminated region generally on the surface of the window viewable by a user. The light source is composed of multiple light elements that can be turned on individually. The present time-passage indicator can also contain a processor that controls the plurality of light elements such that the illuminated region changes to indicate the passage of time. For example, the light elements and surface can be arranged to create the effect (or appearance) of a progress bar on a computer. For example, the illuminated region may be arranged in a straight line, a circle, or another shape, that changes over time to indicate the passage of time. The present device can indicate time passing by a decrease or an increase in the size of the illuminated region (e.g., less or more lights on over time), in different embodiments. In some embodiments, the device may incorporate an illuminated region, as described above, and a screen that displays information (e.g., the timing mode, the total duration, or the elapsed time). In some cases, the screen can display alphanumeric information.

The present devices can operate using multiple modes of display, and multiple means of setting the device, as well as various advantageous structures (e.g., that improve the viewability or the appearance of the device, allow a user to interact with the device, and/or allow the device to communicate with other devices). For example, a display mode can reflect the timing mode (e.g., fixed timing mode or variable timing mode, as described further below) and also may contain other user preferences such as the colors of different segments within the illuminated region, and different illumination settings (e.g., how bright or dim the illuminated region is, and if the illuminated region uses a constant illumination intensity or one that changes over time).

The present time passage indicator devices can have one light element per segment, or more than one light element per segment, in different embodiments. For example, a present device can have from 12 to 60 segments, and from 1 to $10^5$ light elements per segment. In some cases, each segment can be made up of more than one light element, such as from 2 to 10 light elements per segment. In other cases, there can be many light elements per segment, for example, from 10 to 1000, or from 10 to $10^5$ light elements per segment. For example, the present devices can contain from about 100 to about $10^6$ light elements. In some embodiments, the extent of the illuminated region is able to change in increments which are generally indiscernible to a viewer so that changes in the extent of the illuminated region appear continuous. The light elements may be disposed in a pattern in one or two dimensions within the illuminated region. For example, the light segments may be rectangles with the long axis perpendicular to the direction of change of time passage where the longer side of the rectangle is the generally the same as the width of the illuminated region, or the light elements may be elements where all dimensions are much less than the width of the illuminated region, where such elements may be referred to as pixels. The present devices can have an illuminated region with a pixel density from about 5 pixels per inch (PPI) to about 600 PPI, or less than 5 PPI, or more than 600 PPI. For example, the present devices can have a low pixel density of 5 PPI (or less than 5 PPI), or can have a very high pixel density similar to that of a qHD (quad high definition) display, which has about 577 PPI. In the cases where there is more than one light element per segment, the segment color and/or intensity can change across the segment. The light elements can be any elements capable of emitting light in response to an electrical signal, for example light emitting diodes (LEDs). In some embodiments, the light elements may comprise a display technology, for example the light elements can comprise LCD (liquid crystal display), oLED (organic LED), or EL (electroluminescent) technologies.

In some embodiments, at the completion of the timer, or periodically through a total time duration (e.g., at the halfway point, or 6 times evenly spaced throughout the total duration), there is a visible and/or auditory alarm. For example, the light elements can flash or blink one or more colors when the timer ends. The present time-passage indicators can therefore contain a speaker or other sound producing element to produce sounds indicative of factors related to the passage of time.

In some embodiments, the processor controls the light elements using a set of timer parameters. The timer parameters can be user input settings, inputs from sensors, or other parameters that are saved in a memory of the processor. For example, timer parameters can include a mode of operation, a total duration, a sub-duration, a start command, and a stop command, as well as various display related parameters (e.g., light element colors, light element intensities, etc.).

FIG. 1A shows an example of a present time-passage indicator 1000, shown in cross-section, including a housing 1010, a plurality of light elements 1020, and a window 1030. The housing can be many different shapes, including but not limited to a rectangular prism, a triangular prism, a torus, a toroid, a toroidal prism, and a portion of a cylinder (e.g., a half cylinder). The window and/or surface of the window can also be many shapes, including but not limited to, hemisphere, a sphere, a section of a sphere, a cylinder, a half-cylinder, a section of a cylinder, a torus, a half torus where the torus is cut by a plane perpendicular to the axis of revolution, a rectangular prism, a section of a rectangular prism, a triangular prism, a section of a triangular prism, a toroidal surface of revolution of a triangle, oval, or rectangle, or a shape consisting of curves and lines.

Figure 1B:
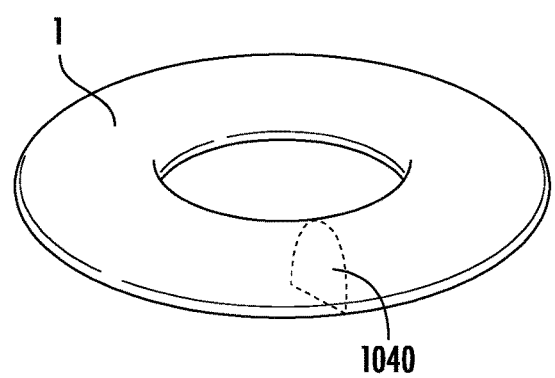
FIG. 1B shows an example of a present time-passage indicator device, in perspective view, in accordance with some embodiments.
Figure 1C:
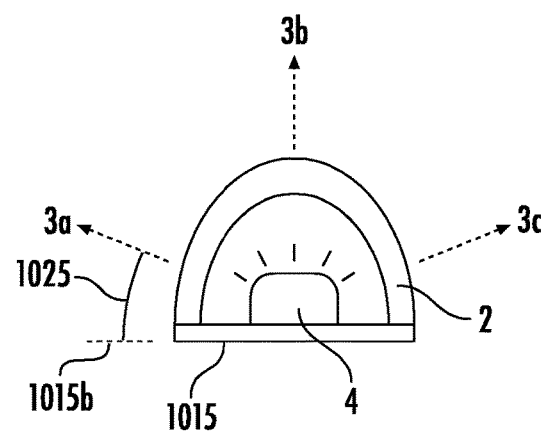
FIG. 1C shows a profile of the device shown in FIG. 1B, in cross-section view, in accordance with some embodiments.

FIG. 1B shows an example of a present time-passage indicator device, in perspective view. The device in this example has a window 1 that is shaped like a half a torus. The device in this example has a cross-sectional profile shown in FIG. 1C, shown in cross-section, where FIG. 1C shows a profile of the device shown in FIG. 1B, cut through plane 1040. The cross-section of the device in this example is curved (approximately parabolic), but in other cases the profile can be semicircular, rectangular, triangular, a flat plane, a circle, an arc of a circle, a triangle, an oval or section of an oval, a rectangle or section of a rectangle, a triangle or section of a triangle, a curve that is a combination of any or all of these, or other shape. The toroidal shaped window 1 in FIG. 1B is one example of a window that transmits light from the light elements to form an illuminated region. FIG. 1C shows the cross section of the window 2, an illumination source 4 that is visible through window 2 at various angles such as those angles corresponding to viewing directions 3a, 3b and 3c, such that the device, when on a planar surface such as a table or a wall, is readily visible from multiple angles. FIG. 1C also shows a bottom surface (i.e., a base) 1015 of the device. The angles for the directions shown in FIG. 1C, and throughout this disclosure, can be measured from the base. For example, viewing direction 3a has a viewing angle 1025, where angle 1025 is measured from a plane 1015b, and plane 1015b is the plane of the base 1015. In other words, a viewing angle of 0° would correspond to a viewing angle parallel to the plane 1015b of the base 1015. The vertex of the angle can be anywhere on the bottom surface (i.e., the base) of the housing of the device. For example, the vertex of angle 1025 is approximately at the light element 4. In general, the vertex of a viewing angle that is measured from the base can be measured from the location of any of the light elements of the device, or from a central point of the base of the housing. For circular or toroidal housings, the center of the base of the housing can be at the center of the circle or toroid. For linear housings with rectangular bases, the center of the base can be at a point equidistant from opposing edges of the rectangular base. In some cases, the central point of a base of a housing is at the balance point (or center of mass) of the housing. The surface of window 2 can be an optically transmissive surface that is at least partially diffusive such that the illumination source 4 evenly (or approximately evenly) illuminates the surface of the window above the light element (i.e., within a segment of the illuminated region) such that it presents a smooth glow to the viewer. Such a dispersive window (or layer on the window) may be viewable from multiple angles. The surface of window 2 may also be clear, such that the light elements can be distinctly viewed through the window (e.g., a relatively clear image of the light elements can be viewed through the window).

In some embodiments, the time-passage indicator may possess a plurality of illuminated segments in a vertical direction as measured from a surface upon which a device may sit, such as a table. In one preferred embodiment, the illuminated segments form rings with each ring adjacent to a ring above and below it, such that the window forms a cylinder or a cone with its base on the bottom. Such a time-passage indicator may be mounted advantageously on a vertical pole so it may be viewed above a region of space, such as where people may occupy. The surface of the window may possess touch-sensitive regions.

The various shapes of time-passage indicators described herein may be built into objects, such as furniture, for example into the surface of a table, a desk or table lamp, or into a speaker phone or conference phone that sits on a table. The time-passage indicators may also be built into elements of buildings, such as walls, floors, ceilings, doors, and doorframes. Other objects into which the time-passage indicators may be built into include wristbands, bracelets, clothing, handbags, cups, watches, smart watches where the time-passage indicator may be around the perimeter of the smartwatch face and may include touch sensors in the region of time passage display, necklaces, earrings, headbands, and elements of vehicles, such as on the dashboard of a car, on the doors, on the backs of the front-row seats, or on the handlebars of a bicycle or the console of a motorcycle. The time-passage indicator may also be integrated into head-up displays such as in airplane cockpits.

Figure 1D:
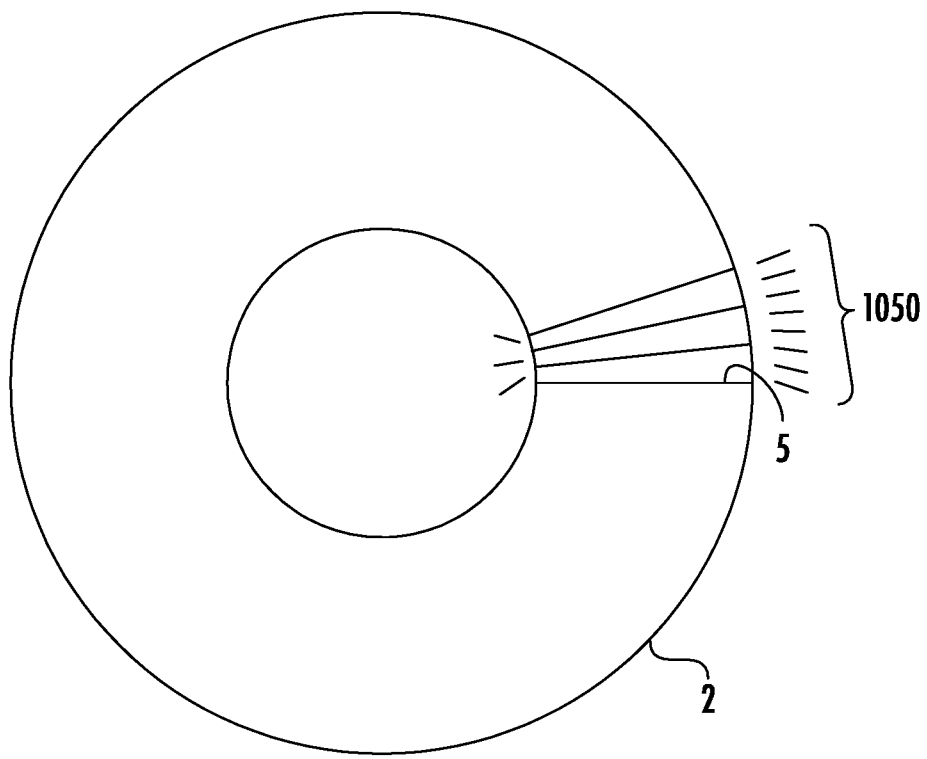
FIG. 1D shows an example of a top view of the device shown in FIGS. 1B and 1C, in accordance with some embodiments.

FIG. 1D shows an example of a top view of the device shown in FIGS. 1B and 1C. The window 2 appears as a annular shape in FIG. 1D when viewed from above. The illuminated region 1050 in FIG. 1D is made of up of three individual segments 5. In some cases, there will be one light element per segment, and in other cases there will be more than one light element per segment. The segments can be individually turned on and off by the processor. In different modes, the segments can be illuminated with different colors and intensities (e.g., to represent the passing of time). The number of segments may be related to a 60 minute clock, such that a timer may have 24 segments, such that each segment represents 2.5 minutes, or a timer may have 60 segments, such that each segment may in some uses represent 1 minute or 1 second. The present devices may have other numbers of segments, such as from about 10 to about 100, or more than 100.

Figure 1E:
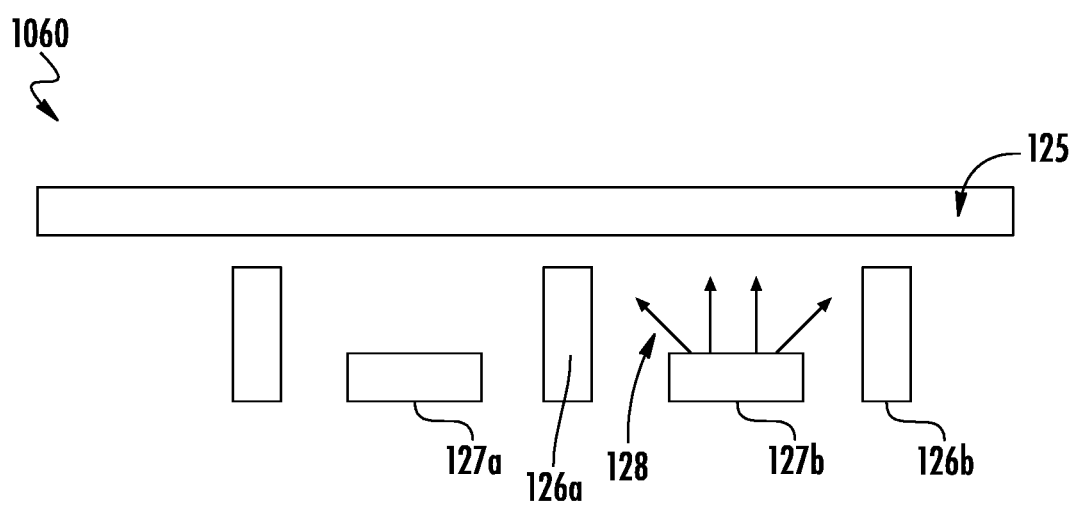
FIG. 1E shows an example time-passage indicator, in cross-section view, in accordance with some embodiments.

In some cases, illuminating one segment minimally illuminates an adjoining segment. This may be achieved via elements, herein referred to as baffles, within the device between light sources, where the baffles are generally partially transmissive, non-transmissive, or reflective. FIG. 1E shows an example time-passage indicator 1060 shown in cross-section, with a window 125, baffles 126a-b and light elements 127a-b. The light element 127b emits light 128, and the light 128 is blocked by the baffles 126a and 126b so that it does not impinge on window 125 in adjacent segments (e.g., the segment associated with light element 127a).

In some embodiments, the light elements are separated by baffles such that light from one segment doesn't reach an adjacent segment. The baffles may be integrated into the window, or the baffles may be a separate unit and optionally possess a thin edge that touches the window.

In some embodiments, the illumination has a blurred effect with no baffling between light sources (or with baffling that only partially blocks the light). In these cases, when one segment is illuminated, at least one neighboring segment may be at least partially illuminated.

Additionally, the light sources may be disposed in such a manner that most of the light is emitted within a region of its segment and a small amount is emitted in a neighboring segment, such as by disposing the light source proximal to the covering surface such that the light source is closer to the surface than to the neighboring light source.

Figure 1F:
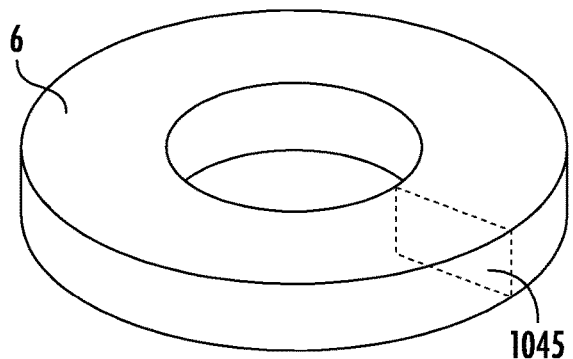
FIG. 1F shows another example of a time-passage indicator device, in perspective view, in accordance with some embodiments.
Figure 1G:
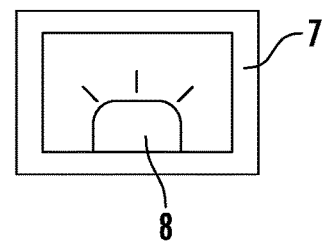
FIG. 1G shows a profile of the device shown in FIG. 1F, in cross-section view, in accordance with some embodiments.
Figure 1H:
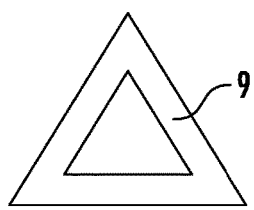
FIG. 1H shows another example of a time-passage indicator device, in cross-section view, in accordance with some embodiments.

FIG. 1F shows another example of a time-passage indicator device in perspective view. The device in FIG. 1F contains an illuminating surface (i.e., a window surface) 6. The cross section of the window shown in FIG. 1F, taken through cut plane 1045 is shown in FIG. 1G. FIG. 1G shows the window 7 in cross-section with illuminating source (i.e., light element) 8. In this example, the cross section is approximately rectangular. Other cross sections are envisioned such as window 9 in FIG. 1H that is approximately triangular in cross-section. The triangular window shown in cross-section in FIG. 1H can form a toroidal window surface with a triangular cross-section, similar to the toroidal window with a curved cross-section shown in FIG. 1B and that with a rectangular cross-section shown in FIG. 1F.

In some embodiments, the cross-sections of the windows of the present time-passage indicators are configured to be viewable from multiple angles. The present time-passage indicators can be viewed at least from a normal viewing angle (e.g., as shown in FIG. 1C relative to element 3b), and also can be viewed from a plurality of viewing angles (e.g., such as shown in FIG. 1C relative to elements 3a and 3c). In some cases, the present time-passage indicators can be viewed from an oblique angle, or a low angle. In some cases, particularly for a circular or ring shaped device, both the near side and the far side of the ring can be viewed from oblique or low angles.

Figure 1I:
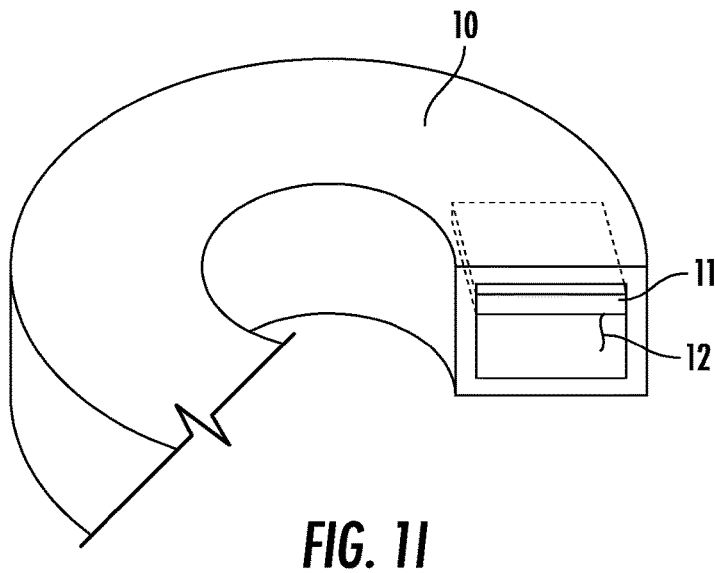
FIG. 1I shows an example of a present time-passage indicator device with a touch sensor, in perspective view, in accordance with some embodiments.

In some embodiments, the device contains means for interaction with human touch by a finger. FIG. 1I shows an example of a present time-passage indicator device with a touch sensor 11 that is an optically transmissive generally planar means that is also electrically conductive, in perspective view. For example, touch sensor 11 can be formed from indium tin oxide (ITO) on a plastic film (e.g., polyethylene terephthalate (PET)), that is disposed on a side of the window opposite to the external window surface 10, with a wire 12 connected to a detection circuit (not shown). The ITO may be coated directly on an inner or outer surface of a window, with isolated regions forming a touch pad when connected to a touch-sensing circuit via an electrical contact between the ITO region and the circuit. The ITO may be coated on a separate optically transmissive means such as a plastic sheet which may then be affixed proximal to the window. In other embodiments, the touch sensor 11 can be disposed on an exterior side of the window or proximal to the window. For example, the ITO can be disposed on a plastic sheet affixed to the outside of the window or directly on the outer surface of a window, where in either configuration the ITO can be overcoated with a second layer (e.g., a dielectric layer, $SiO_2$, or a layer of polymeric material) and the touch sensor can be affixed to the outside of the window. The purpose of the second layer is to protect the conductive materials of the touch element (e.g., ITO in the above example) so that the touch sensor can function for the lifetime of the device even though it is not protected by the window. A plurality of such touch sensors may be disposed within the device to allow touch interaction with the device at multiple points, such as for setting a timer where the parameter or value to be set by the touch interaction is related to the position of the touch sensor.

Touch sensor 11 allows a user to interact with the device by touching an area of the device that is also transparent to light, which is advantageous for several reasons. For example, a user can touch a location on the illuminated region of the device that corresponds to a particular amount of time in order to set that amount of time as a total duration for which the timer will time. It is also advantageous because a large fraction of the device can be an illuminated area, and less space on the device needs to be designated for user input elements (e.g., buttons).

Figure 1J:
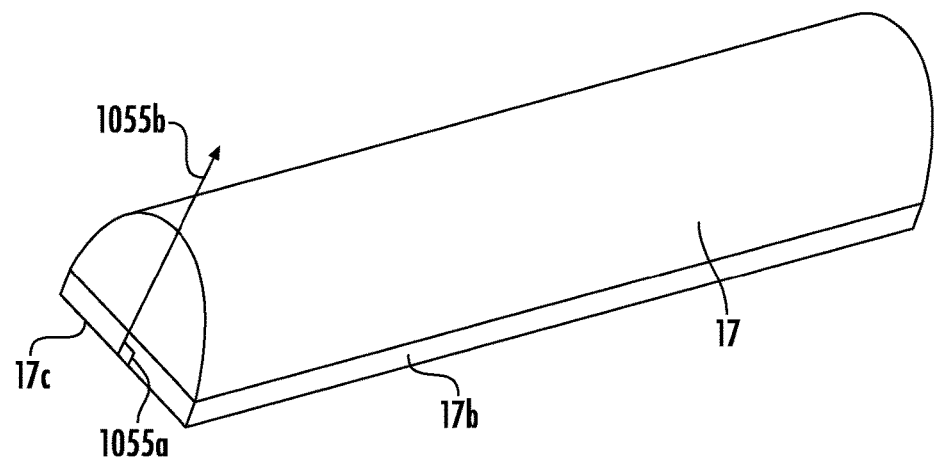
FIG. 1J shows another example of a present time-passage indicator device with a straight (or linear) window, in perspective view, in accordance with some embodiments.

FIG. 1J shows another example of a present time-passage indicator device where the device window 17 is straight (or linear), in perspective view. The linear window 17 is attached to a housing 17b in this example. The window surface for the device shown in FIG. 1J would be rectangular when viewed from above, and can show time passing by sequentially illuminating segments within the rectangle. For example, the illuminated region can appear rectangular from above, and can grow or shrink linearly in a direction from one side of the rectangle to the other as time passes. The cross-section of the linear window 17 may be any of those described above. Linear window 17 can be shaped approximately like a right rectangular prism, right triangular prism, or a right prism with a semi-circular or parabolic base, or a right prism with a base of any shape.

FIG. 1J also shows a bottom surface (or base) 17c or housing 17b. The base 17c is adjacent to a flat surface upon which it is sitting. FIG. 1J also shows a normal viewing angle 1055a and a normal viewing direction 1055b. Normal viewing angle 1055a is an angle normal to the base 17a of the device, and normal viewing direction 1055b is a direction normal to the base 17a of the device. In general, regardless of the shape of the present time-passage indicator devices, a "normal viewing angle" can refer to an angle that is normal to a base of the housing. The "base" of the present time-passage indicator devices can refer to a surface of the device (e.g., the housing) that is adjacent to a flat surface upon which the device can sit. In some embodiments, the base can have feet, pads, or other structures attached to it that improves the ability of the device to sit on a flat surface (e.g., without slipping). For example, a present device can include rubber feet attached to the base of the housing of the device to prevent the device from slipping and to reduce shock if the device is dropped on the base. The elevated surface provided by such feet may also advantageously allow sound to be emitted from an aperture in the surface of the base that is elevated from the supporting surface such as a table, where a sound-producing means inside the base such as a speaker emits sound towards the aperture.

Figure 1K:
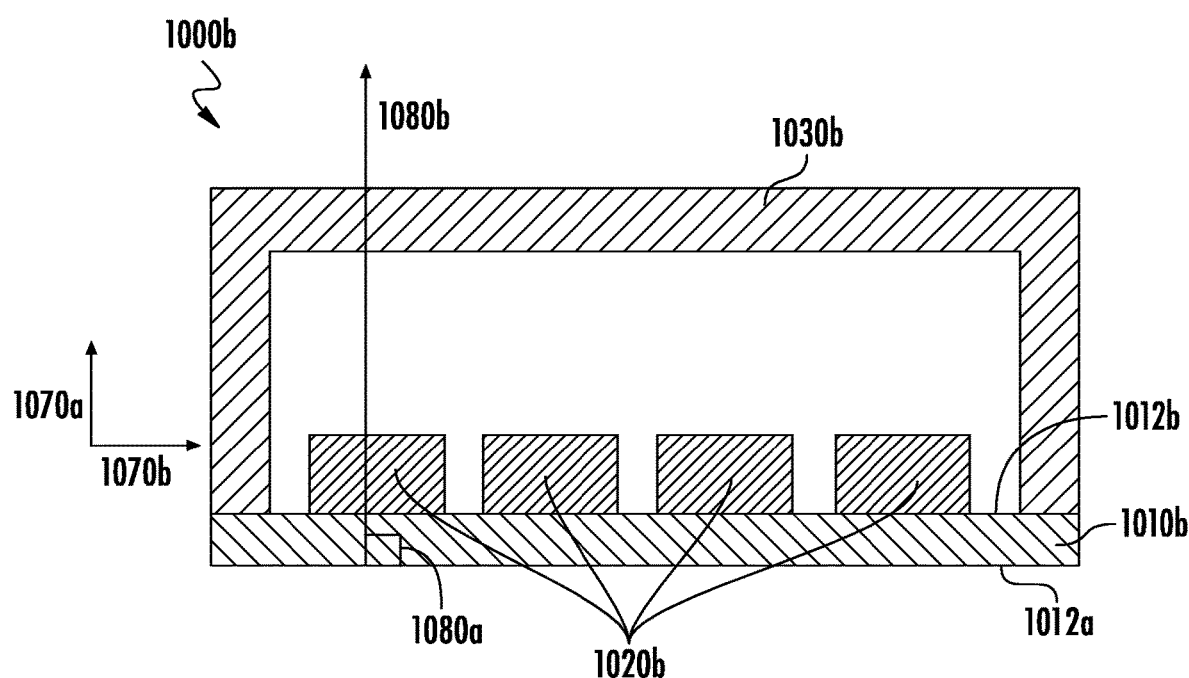
FIG. 1K shows an example of a present time-passage indicator, in cross-section view, in accordance with some embodiments.

FIG. 1K shows an example of a present time-passage indicator 1000b, in a cross-section view, including a housing 1010b, a plurality of light elements 1020b, and a window 1030b. In contrast to the example shown in FIG. 1A where the window 1030 is flush with the housing, the window 1030b in this example protrudes from the housing. In other words, when the device is sitting on a flat surface, e.g., a table, then the table is below the device, and the window in this example protrudes from the housing since it extends in a direction above the housing. In this example, the housing 1010b has a bottom surface (i.e., a base) 1012a, which would be adjacent to the flat surface that the device is sitting upon. The figure also shows a normal viewing angle 1080a, which is an angle normal to the base 1012a of the housing, and a normal viewing direction 1080b, which is a direction normal to the base 1012a of the housing. The housing also has an opposing surface 1012b, which is the surface of the housing that the window 1030b is attached to. In other words, surface 1012a is opposite surface 1012b. Therefore, the window in this example protrudes from the housing in the vertical direction 1070a. In this example, the window also protrudes from the housing in the normal viewing direction 1080b, which is a direction parallel to the vertical direction 1070a, and is also normal to the base 1012a of the device housing 1010b. In other examples, the window may protrude from the housing in one or more lateral directions 1070b as well as protruding in the vertical direction 1070a. In some embodiments, the window protrudes from the housing in vertical (i.e., normal viewing) and/or lateral directions by more than 1 inch, more than ½ inches, more than ¼ inches, more than ⅛ inches, more than 1/16 inches, more than 1/32 inches, from 1/32 inches to 1 inch, or from 1/16 inches to 2 inches. In some embodiments, the window protrudes from the housing in vertical and/or lateral directions by more than 10%, more than 20%, more than 30%, or more than 50% of the total height of the device. In some embodiments, the window protrudes from the housing in vertical and/or lateral directions by more than 10%, more than 20%, more than 30%, or more than 50% of the total width of the light emitting region of the device. The housing 1010b in this example is a flat plate that the light elements are mounted onto, and the window 1030b has a rectangular cross-section. In other embodiments, the housing and the window can be other shapes. The window and the housing can be many different shapes, including but not limited to a rectangular prism, a triangular prism, a torus, a toroid, a toroidal prism, and a portion of a cylinder (e.g., a half cylinder). The window protruding from the housing can be advantageous because it can allow light to escape from the sides of the device, which can enable the illuminated region to be viewable from many different angles, including the low angles described herein.

The present time-passage indicator devices can utilize different modes of display. For example, the length of the illuminated region can represent a fixed amount of time or a variable amount of time, and the illuminated region may contain different colors and light intensities in different segments. FIGS. 2A-2H illustrate different display embodiments for the present time-passage indicators. FIGS. 2A-2H use an annular shaped illuminated region to illustrate different display embodiments, however, as described above, the present devices are not limited to have annular shaped illuminated regions. In other embodiments, non-annular shaped illuminated regions can also utilize the display embodiments describes by FIGS. 2A-2H. For example, a linear device with a rectangular illuminated region can utilize the different colors and light intensities described in FIGS. 2A-2H for segments that are rectangular, instead of the segments being portions of an annular illuminated region as shown in FIGS. 2A-2H.

The embodiments described herein generally have a single window, however the time-passage indicator devices may consist of a plurality of windows within a single unit or device. A single window may consist of generally contiguous light emission regions, whereas a device with a plurality of windows may contain windows that are separated by regions that do not significantly emit light. For example, an embodiment with an annular window may contain non-contiguous annular light emitting time passage indicating regions that are concentric. In yet another embodiment, a time-passage indicator with straight time passage indicating regions may contain two or more regions that are separated by a dark (non-light emitting) region. It is conceived that the various embodiments described herein may be applied to devices with a plurality of windows.

Figure 2A:
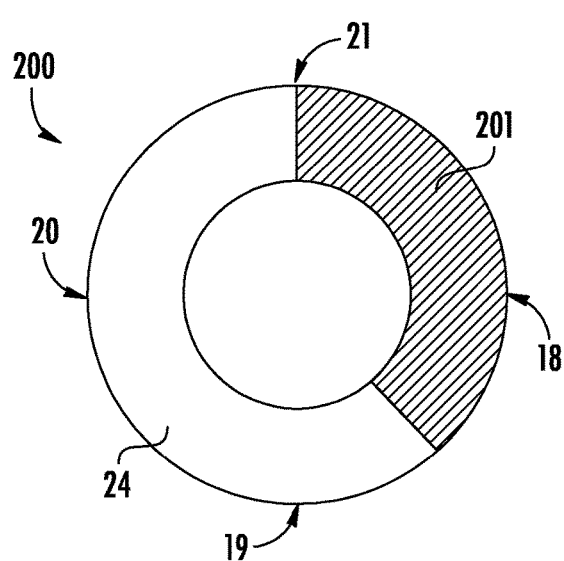
FIG. 2A shows an example of an outer surface of a window of a present time-passage indicator, viewed from directly above, in accordance with some embodiments.

FIG. 2A shows an example of an outer surface of a window 200 of a present time-passage indicator, viewed from directly above. The window in this example is ring shaped when viewed from above. The illuminated region 201 shows the region where the light elements (not shown) are on, and the non-illuminated region 24 shows the region that could be illuminated by the light elements but is not illuminated in this example. The whole ring of the illuminated region 201 and the non-illuminated region 24 represents an amount of time, depending on the mode. For example, the timing mode can be a fixed mode or a variable mode. FIG. 2A shows a position 21 at the top of the ring (i.e., at 0° and/or 360°) of the illuminated region 201, a second position 18 at the right side of the ring (i.e., at 90°), a third position 19 at the bottom of the ring (i.e., at 180°), and a fourth position 20 at the left side of the ring (i.e., at 270°). In a fixed timing mode the entire ring would be fixed to represent 60 minutes or 60 seconds. Therefore, in a fixed timing mode, position 21 represents 0 minutes and/or 60 minutes, position 18 represents 15 minutes, position 19 represents 30 minutes, and position 20 represents 45 minutes. Note however, that in fixed timing mode, many different total durations of the timer can still be set. For example, a user could select the total duration of the timer to be 40 minutes in fixed timing mode, and the timer could start with the illuminated region being ⅔ of the total ring. As the timer progressed, the illuminated region would then shrink until it reached 0 minutes, at which point the timer would end.

In an alternate embodiment, the illuminated region in FIG. 2A could utilize a variable timing mode, where the duration represented by the entire ring is adjustable (e.g., can be set by a user input) and can represent any number of hours, minutes or seconds. In a non-limiting example, the illuminated region in FIG. 2A is operating in a variable timing mode, and a user input 24 minutes for the total duration. In that example, position 21 represents 0 minutes and/or 24 minutes, position 18 represents 6 minutes, position 19 represents 12 minutes, and position 20 represents 18 minutes. The total duration of the time-passage indicator in the variable timing mode can be any amount of time, such as 1 minute, 5 minutes, or 2 hours.

A fixed amount of time such as one hour may be effective as a timer. It can also be useful as the user learns the different operating modes of the present devices, and also what a partially illuminated device looks like as it measures the passage of time. In some embodiments, the illuminated region appears as portions of a circle. In fixed timing mode the circle represents one hour, and is familiar as a clock, such that half a circle is readily interpreted as 30 minutes. In other embodiments, the illuminated region can appear as a portion of a straight line of lights. The total duration of an illuminated region arranged in a straight line could also be fixed mode or variable mode. In fixed mode, the total length of the straight line that can make up the illuminated region is 1 hour, while in variable timing mode the total length of the straight line can represent any number of hours, minutes or seconds. In some embodiments, markings may be disposed on or near the segments making up an illuminated region to indicate an amount of time.

The fixed and variable timing modes may be useful as timer and task modes, respectively. In timer mode, a user needs to track a specific amount of time, such as 45 minutes. In task mode, a user needs to keep track of how much time has elapsed when working on a project, especially when the amount of time allotted for the project is longer than an hour. For example, a meeting has a set agenda with a fixed number of items to get through, and is 2.5 hours long. For the users, the time of day may be less important than being able to compare the progress through the agenda with the progress along the illuminated region, and therefore the user may want to use a variable timing mode with the total duration being the length of the meeting. For example, a user may start a meeting at 1:25 pm and enter an ending time of 3:15 pm, where the amount of time in this example is intentionally selected to be an odd amount of time (one that is not composed of an integral number of half hours, for example) and thus is not easy to compute with. The user in this example has an agenda with ten items on it. The user can note for example that the progress bar is at the halfway point yet the meeting has only completed three of the ten agenda items. This mode can be applied to any number of projects from cleaning the house to writing a term paper. The ease with which the user can discern the fraction of time that has elapsed and how much time remains (e.g., through a project or meeting), compared to having to calculate how much time has passed and how much remains from a current time of day and a start time and an end time, is one of the advantages of the present time-passage indicators.

In some embodiments, in timer mode a user may have multiple choices for setting the device. For example, the user may input a time, for example 20 minutes, and the timer begins to count and display the 20 minutes generally concurrent with the moment of selection, such as by touching a device at its 20-minute mark, or by selecting 20 minutes on a smartphone app. Additionally, a user may select a combination of start time, stop time, and duration, where selecting any two of these fully defines the time passage span to be displayed. In some embodiments, the default start time is the present time. For example, a user may select an end time such as 3:15 pm, and a start time of the present time, where the time span to be displayed is computed by the device as the difference of the present time and 3:15 pm. In yet another example, a user may also select a start time and a stop time, where the start time may be later than the present time, and the device computes the time span to be displayed as the difference between the stop time and the start time, where the indication of time passage may start at the user-selected start time. The timer may also have a start, pause, and stop inputs.

The present time-passage indicators can operate in a count-up mode or a count-down mode. In a count-down mode, the illuminated region would start at a size representing the total duration to be timed, and as the time progressed the illuminated region would decrease in size or length. When the time counted by the timer ended, the illuminated region would be gone (unless a visual alarm were used to mark the end of the time). In a count up mode, the illuminate region can start with no size and would then increase in size or length as time passed. In some cases, in count up mode the illuminated region could display the total duration and/or segments to show a user how much time is being timed (e.g., using illuminated segments to mark the total duration being timed, and/or periodic segments illuminated throughout the window to show segments throughout the total duration being timed).

Figure 2B:
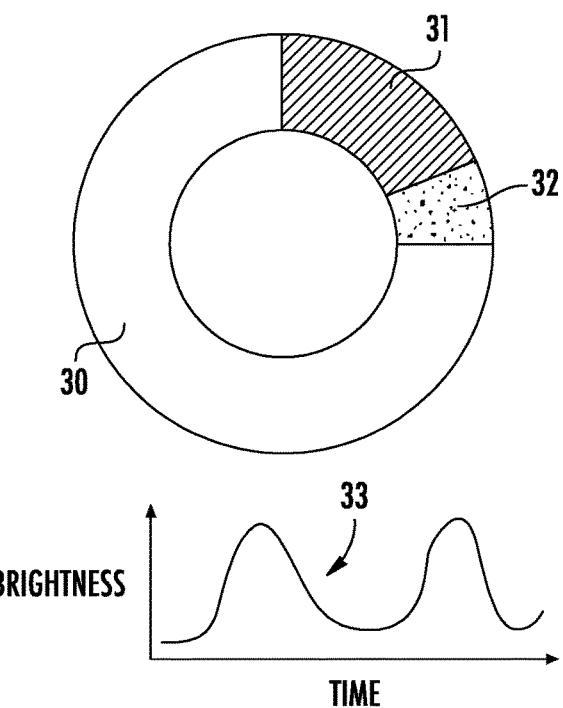
FIG. 2B shows an example of an outer surface of a window of a present time-passage indicator, viewed from directly above, and a plot of brightness versus time, in accordance with some embodiments.

The display may have a method of displaying when it is in task mode versus timer mode. In one embodiment, timer mode is indicated by having a different color light up at each 5 minute mark, possibly including the first light segment. Thus a user can quickly see the 5 minute marks, such as indicated by red lights when the other intervening segments are blue, and it is clear that the device is in timer mode. In another embodiment, the timer mode can have the lights pulsing dark and light. FIG. 2B shows an example of an outer surface of a window 30 of a present time-passage indicator, viewed from directly above, where the illuminated region contains segments 31 and 32, and segment 32 is at the end of illuminated segment 31, where regions 31 and 32 are different colors. In another embodiment, the region 32 may have an intensity that varies with time, such as in the brightness versus time curve 33.

Figure 2C:
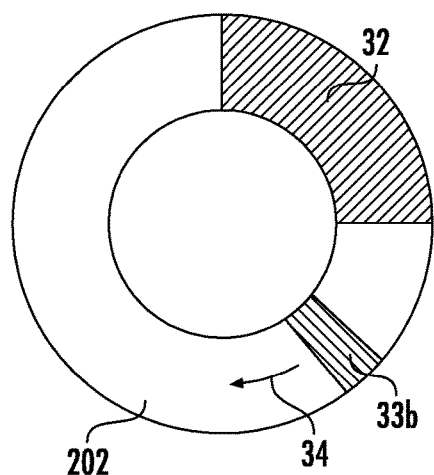
FIGS. 2C-2F show examples of outer surfaces of windows of present time-passage indicators, viewed from directly above, in accordance with some embodiments.

In some embodiments, a region of segments, such as a single segment, moves around or along the window of the time-passage indicator (i.e., the illuminated and non-illuminated regions of the window) in a different color than the increasing region of the progress bar, such a red light or lights that moves every second. FIG. 2C shows an example of an outer surface of a window 202 of a present time-passage indicator, viewed from directly above, having a segment 32 of the illuminated region indicating the passage of time and a moving segment 33b that moves around in a direction 34.

Figure 2D:
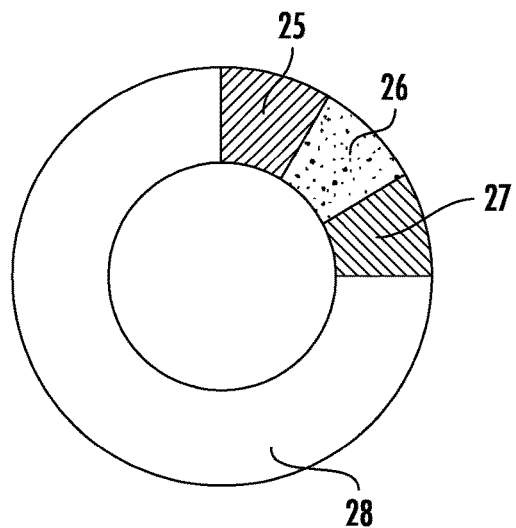

In another embodiment, timer mode may be indicated by a single or several segments in a fixed location that go dark and light every time increment such as a second that may be at the end, beginning, middle, or other fixed position of the device. Since the lights are programmable, many other means of illuminating lights by changing color and intensity are possible to indicate a mode of operation. FIG. 2D shows an example of an outer surface of a window 28 of a present time-passage indicator, viewed from directly above, wherein the time is displayed in a continuous section of illuminated regions where alternating regions 25, 26, 27 are different colors. For example, segments 25 and 27 can be the same color and segment 26 can be a different color.

Figure 2E:
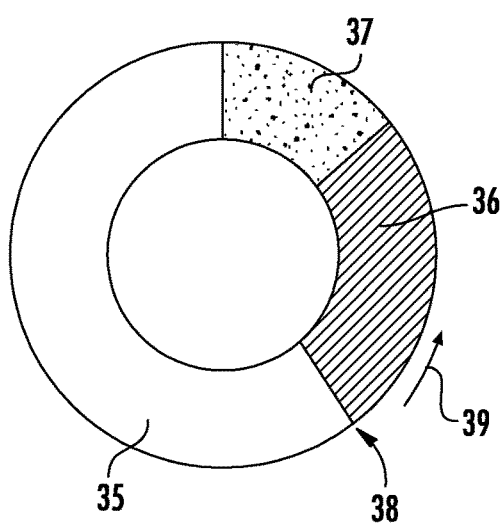

In any timing mode it may be preferable to have a region of illumination that is a small fraction of the length of the total illuminated region, such as between 10-20% of the length of the window, that is at the end of the time measurement that changes to a different color. The colors may be selected on a digital interface over a wired or preferably wireless connection to the device, where the user may choose the starting and ending colors. FIG. 2E shows an example of an outer surface of a window 35 of a present time-passage indicator, viewed from directly above, which counts down time in direction 39, and the illuminated region is made up of illuminated segments 36 and 37. In this example illuminated segment 37 is at the end of the illuminated region and is of a different color than segment 36, indicating that the timer is about to run out. Ending segment 37 can represent a fixed amount of time, such as 10 minutes before the end of the timer. In some cases, the combined region 36 and 37 may be of one color until the timer reaches the ending segment 37 at which time the illuminated region (that would only be segment 37 at that point) changes to a different color.

Figure 2F:
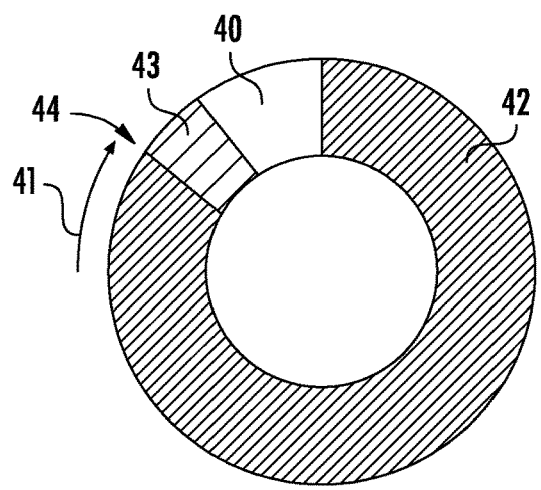

FIG. 2F shows an example of an outer surface of a window 40 of a present time-passage indicator, viewed from directly above. In this example, the device is operating in count-up mode where the illuminated region, made up of illuminated segments 42 and 43, increases in size (in the direction 41), and changes to a different color in region 43 when the time has increased above a predetermined time at position 44. As described in the previous example, segment 43 may be a different color than segment 42 throughout the entire duration of the timer, or only when the timer reaches segment 43.

In some embodiments, the present time-passage indicators comprise buttons or other such input elements (e.g., knobs, sliders, etc.) that allow a user to interact (e.g., set) the device. For example, the timing mode can be selected using such user input elements. In some embodiments, the user input elements include one or more touch sensors which contain one or more touch elements. For example, timing modes may be selected by a predetermined series of touch interactions with the device. In some embodiments, a user can interact (e.g., set) the present time-passage indicators using a separate digital device, where the time-passage indicator can communicate with the separate digital device (e.g., a remote control, a smart phone, a tablet, a computer, and/or a smart building management system) to receive and/or send instructions. For example, using user input elements on the device, or using a separate digital device (e.g., a device with a screen), the user may be prompted to select a first color (e.g., one that makes them happy or relaxed), and a second color (e.g., one that makes them panicky or awake), and then choose whether to progress from the first to the second color (e.g., from the happy to the panicky color), or vice versa. In task mode, the region at the end that changes color and may be a fixed or selectable amount of time (e.g., 15 minutes, such as to indicate a 15 minute warning that the task is nearing completion) can change to the second color input by the user.

Figure 2G:
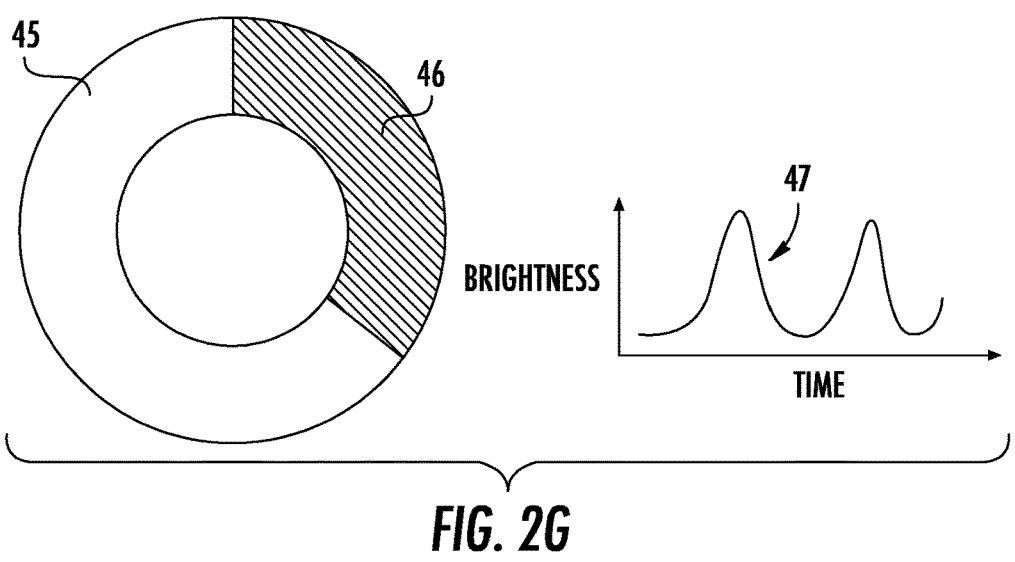
FIG. 2G shows an example of an outer surface of a window of a present time-passage indicator, viewed from directly above, and a plot of brightness versus time for segments of an illuminated region, in accordance with some embodiments.

The device may be set remotely (e.g., by communicating with a separate digital device) or directly on the device (e.g., using a user input element on the device). Remote setting may be accomplished via a wired connection or a wireless connection to a separate digital device, such as a computer such as a laptop, desktop, tablet, or smart phone. In some embodiments, the present time-passage indicator devices have wireless communication electronics that enable the devices to be set remotely and/or communicate with other devices. The timer parameters (e.g., a mode of operation, a total duration, a sub-duration, a start command, and a stop command, as well as various display related parameters) can be set remotely, in some embodiments. The interface on the separate digital device may, for example, provide a choice of modes, colors, brightness, power usage, and fixed timing and variable timing mode (i.e., timer and task mode) settings. Power usage settings may include illumination modes that use less power, such as by dimming the intensity of the light elements to less than their full brightness, or by pulsing the illumination from the light elements, such as by going from off to on smoothly and back to off, thus having a less-than-100% duty cycle for the lights being on. The pulsed illumination may be smooth in a pattern that is similar to (or represents) breathing. In some embodiments, the lights will always be illuminated to a level that is visible such that a user looking at the device does not need to wait to see the progress status. Timer mode may have a set of preselected buttons (places to click or touch on the interface screen) representing a range of times, such as 1, 5, 10, 15, 20 or 60 minutes. FIG. 2G shows an example of an outer surface of a window 45 of a present time-passage indicator, viewed from directly above, with a region 46 whose illumination brightness varies with time in a pattern shown by the brightness vs. time curve 47. The timer mode (i.e., fixed timing mode) interface may also have a clock that can be touched to select time in increments of 5 minutes. In task setting mode, there may be a method of selecting a total duration for the device using a user input element (such as via a wheel, or via typing an amount of time or via entering via typing or selecting from a wheel type clock an end time) or by using a separate digital device.

Figure 2H:
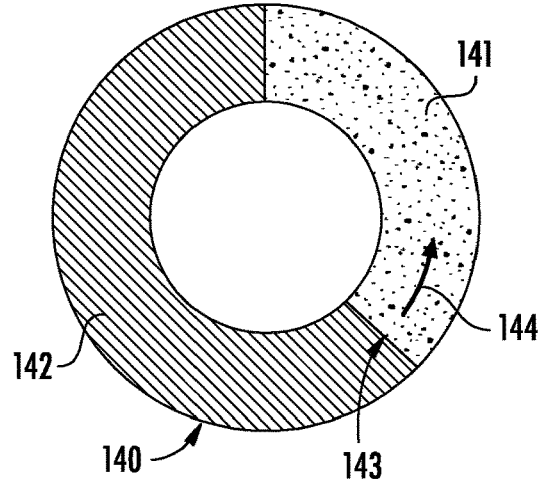
FIG. 2H shows an example of an outer surface of a window of a present time-passage indicator, viewed from directly above, in accordance with some embodiments.

FIG. 2H shows an example of an outer surface of a window 140 of a present time-passage indicator, viewed from directly above, that displays the passage of time in manner such that all segments are generally illuminated. The surface is divided into at least two regions 141 and 142 that are illuminated in different colors. The boundary between the two regions 143 moves with time in a direction such as 144 such that region 142 increases in area at the same rate that area 141 decreases in area.

In some embodiments, a mode of display is configured to give the effect of filling up the progress bar by dripping, mimicking an hourglass. For example, an illuminated region can be growing as a timer operates in count up mode, and adding additional segments can occur by segments being sequentially illuminated, and thereby appearing to move, from a starting end of the window opposite the illuminated region to the end of the illuminated region.

Figure 3:
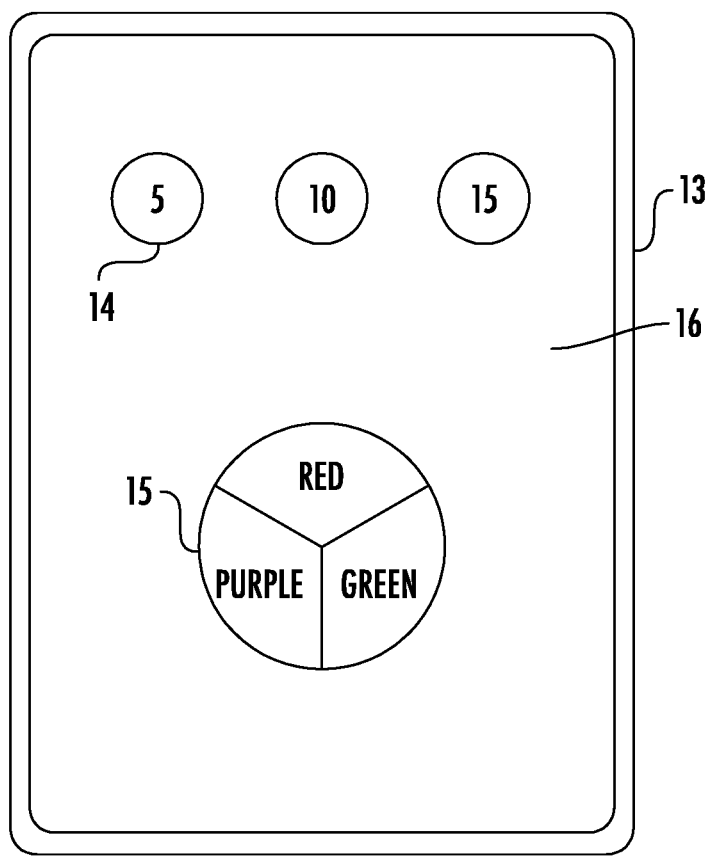
FIG. 3 depicts an example of a digital device with a screen displaying methods of setting the present devices, in accordance with some embodiments.

In some embodiments the device may be interacted with wirelessly with a digital device, such as a smartphone, tablet, or personal computer. FIG. 3 depicts an example of a digital device 13 with a screen 16 displaying methods of setting the present devices, such as buttons 14 that indicate amounts of time (e.g., for a total duration in fixed or variable timing modes), and a color wheel 15 that enables setting of colors of the device along with other settings to associate the color with. Many options for settings are possible as described above.

The colors for any of the timing modes may be selected from a color wheel display as known in the art. The color preferences may also be saved (e.g., using computer memory of the device processor, on a separate device).

In some embodiments, a digital platform on the present time-passage indicator devices, or on a separate device in communication with the time-passage indicator, is used by the user to set the device (e.g., set the timing mode, total duration, colors, etc.). The digital platform may have the ability for third parties to write display modes.

In yet another embodiment, the device is settable via an interface on the device (e.g., containing the user input elements), such as a touch screen, knobs, wheels, or buttons. In some cases, the present time-passage indicators also include a display that displays information such as the timing mode and total duration of time entered.

In some embodiments, the device is settable using a user input element that is a touch sensor, and the touch sensor is arranged such that the user sets the device by touching the surface of the illuminated region. For example, a user in timer mode may tap the outer surface of the window of the device at the halfway point to start a 30 minute timer. Swiping may also be used to interact with the device. For example, longer times may be set in task mode by sliding a finger around the window more than once plus a fraction of a full circle (on a circular device), such that tracing the surface one and a half times indicates 1.5 hours and the device automatically displays the total duration as 1.5 hours in task mode. For example, the mode can be set by a user touching twice in rapid succession the outer surface of the window at a location having a touch element.

Figure 4:
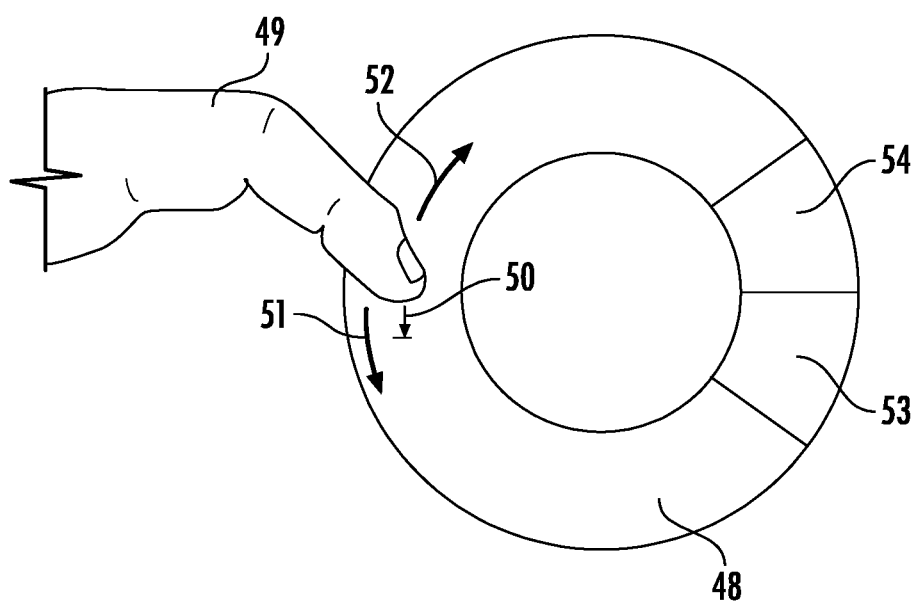
FIG. 4 shows an example of a present time-passage indicator device, in perspective view, in accordance with some embodiments.

FIG. 4 shows an example of a present time-passage indicator device, in perspective view, with outer window surface 48 that is sensitive to the touch of a finger 49. The surface 48 may have distinct regions 53 and 54 that can be touched within each region to activate a circuit. These regions may be spaced evenly (or unevenly) along the illumination region. The touch may be a tap 50, or a swipe 51 or 52 wherein the finger touches and traverses at least two adjoining regions (e.g., adjacent touch elements of the touch sensor). The swipe may be any portion of the time surface 48 or traverse the time surface more than once, such as going around one and a half times to indicate a time longer than a preset amount of the total region. In a preferred embodiment the finger 49 may touch and hold its position for a time (such as 1 second, 2 seconds, or 3 seconds, or more) at which point the time setting mode may change. Such a mode may be switching from a coarse to a fine setting, where the first touch sets the time at a multiple of 5 minutes, and then when the mode changes, moving the finger along in a clockwise direction may increase the time duration by 1 minute increments with each touch sense region triggered. The time set may be indicated by a digital readout or by a voice readout.

Touch interactions may include single, double, or multiple taps, swipes, and multiple finger interactions. Multiple finger interactions may include two-finger taps and two fingers moving apart. An example of the use of two fingers moving apart may be the selection of a color, where the full length of the device, such a circle, displays a color wheel, and a two-finger spreading swipe expands a region of the color wheel to the whole color wheel such that more precise colors may be selected. For example, timer progress may be started and stopped by tapping (e.g., a particular location), or by double tapping (e.g., a particular location).

For short total time durations, such as 1 and 5 minutes, the timer may use the full length of the illuminated area, as there may be too few light segments to effectively display in fine enough increments the passage of time.

The number of light segments making up the illuminated region (or the illuminated and non-illuminated regions) may be changed on different devices for different applications. A simple time tracking device may have a circle of only 6 segments, each segment representing 10 minutes. Alternately, a device may be composed of 60 segments such that each segment may represent one minute for a total of 60 minutes displayed, or one second for a total of 60 seconds displayed. Additionally, a device may be composed of more than 60 segments, such as 100 or 200 segments, such that the passage of time looks nearly continuous to the viewer.

In some embodiments, adjacent segments between an illuminated region and a dark region illuminate or darken over time. This can be useful to visualize that the timer is active and time is passing to an observer. In some cases, the user will be able to see in a short amount of time, such as within 1 to 5 seconds, that the progress bar is changing. In some embodiments each segment is turned on nearly instantly, in a manner similar to a ticking clock.

Figure 5:
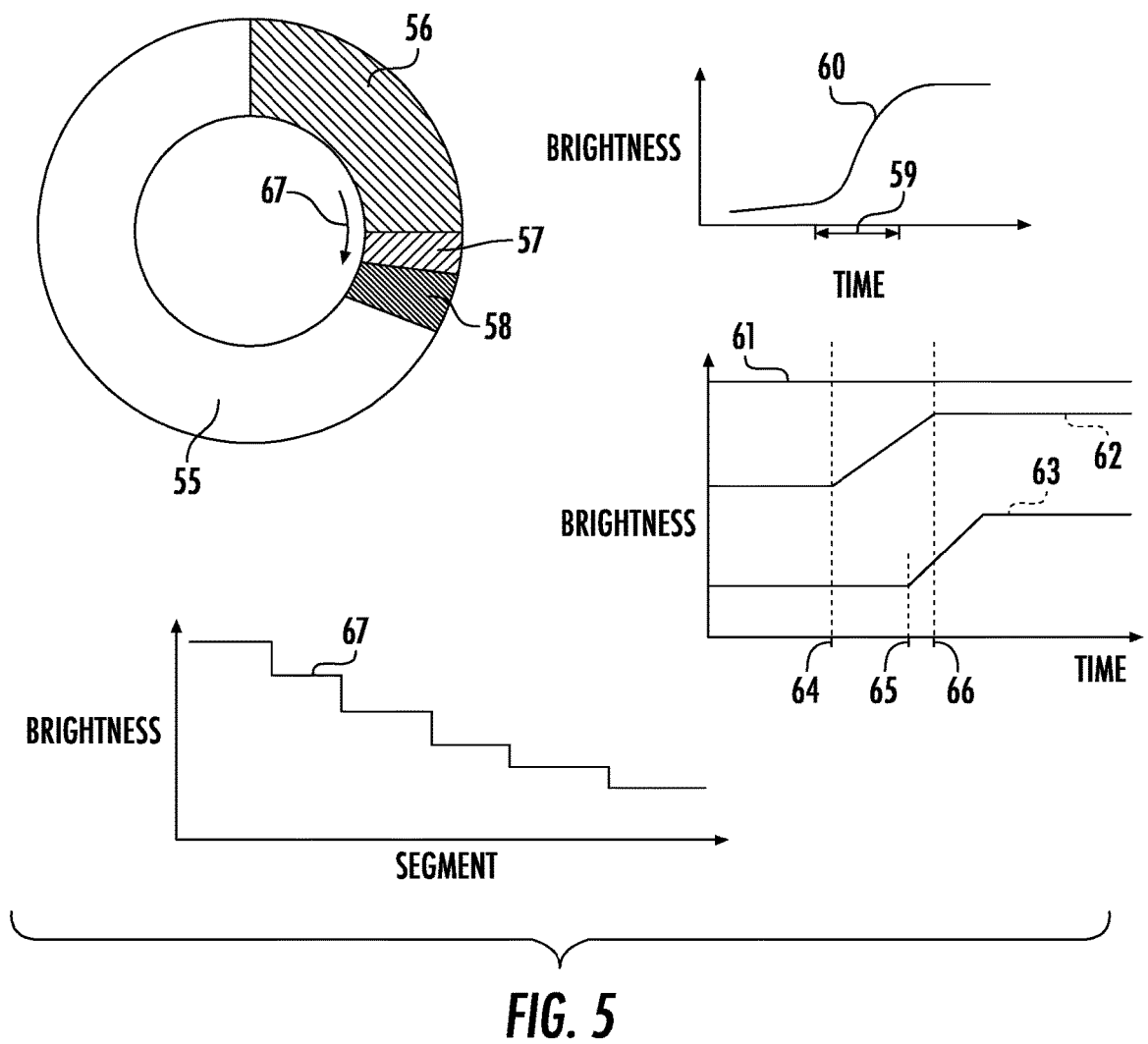
FIG. 5 shows an example of a window of a present time-passage indicator device, viewed from directly above, and three plots of brightness versus time for segments of an illuminated region, in accordance with some embodiments.

FIG. 5 shows an example of the window 55 of a present time-passage indicator device, viewed from directly above. In this example, the device is operating in count up mode and the illuminated region (made up of segments 56, 57 and 58) is growing in the direction 67 as time progresses. Segments 57 and 58 are located at the end of the illuminated region and change brightness over time. For example, segment 58 can illuminate (or segments 57 and 58 can illuminate together) from off to on over a time generally equal to the time indicated by the segment. Brightness versus time curve 60 shows an example of this, where the segment 58 illuminates following curve 60 over time duration 59. Brightness versus time curves 61, 62 and 63 show an alternate embodiment, where two segments 57 and 58 may be illuminating simultaneously to visually smooth out the transition from off to on. In this example, segment 56 is fully illuminated following curve 61, and at time 64 segment 57 begins to illuminate following brightness versus time curve 62. Before segment 57 is fully on (has reached its predetermined steady state of brightness) at time 65 segment 58 begins to illuminate following brightness versus time curve 63 such that at time 66 segment 57 is fully on, while segment 58 continues to increase in brightness. More than two segments, such as 3, 4, 5, or more segments may utilize similar offset brightness-time traces where each segment is offset in time from the previous segment. For example, a group of segments at a particular instant in time can follow brightness versus segment curve 67 that shows a staircase shape where each step of the stair represents the brightness of a segment within the illuminated region.

In some embodiments, the present time-passage indicator devices can utilize one or more touch sensors as user input elements. The touch sensor can contain touch-sensitive circuitry, such as capacitive sensors. The touch sensors (or touch sensor arrays) contain touch elements that can be triggered individually (e.g., by a user's finger). There may be one touch element per segment (e.g., in 5-minute increments, such that there would be 12 touch elements around a circular device), or more than one touch element per segment.

Figure 6A:
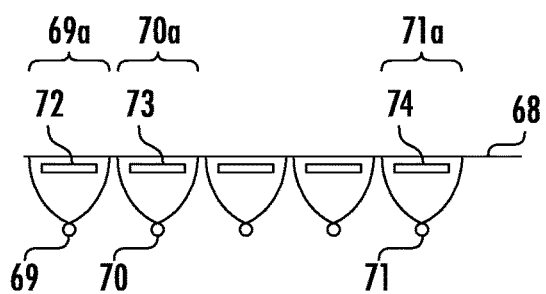
FIGS. 6A-6B show examples of present time-passage indicator devices, viewed in cross-section, in accordance with some embodiments.
Figure 6B:
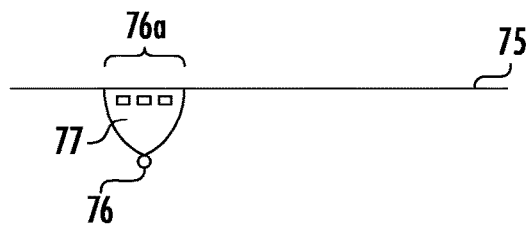

FIG. 6A shows an example of a present time-passage indicator device, viewed in cross-section. The figure shows a window 68, light elements 69, 70 and 71, and touch elements 72, 73 and 74. There can be one light element per segment of illuminated region, where light elements 69, 70, and 71 define three segments 69a, 70a and 71a, respectively. In this case, touch sensors 72, 73 and 74 are located on the inside of the window 68 and are aligned with the three segments 69a, 70a and 71a created b the three light elements 69, 70 and 71. Therefore in the example shown in FIG. 6A, there is one light element per segment, and one touch sensor pad (or touch element) 72, 73 or 74 per segment. Alternately, not all consecutive segments may have touchpads such as having touchpads only every 5 segments, e.g., touch elements 72 and 74 may be present while the other touch elements shown in FIG. 6A may be absent. FIG. 6B shows another example with similar structures as in FIG. 6A including a window 75, a light element 76, a segment 76a, and a group of three touch elements 77 located on the inside of window 75. In this example, multiple touch pads 77 are aligned with a single light element 76 defining segment 76a.

The device once started may be prevented from accidentally being reset by a sequence of swipes or taps, such as double tapping, which lock the device. The same sequence may be used to unlock the device to change settings. The device once started may after a period of time lock the device without user input. The present devices may also be locked to prevent theft. In some embodiments, the device is locked using a user input element on the device (e.g., a button, or touch sensor input) or using a remote input (e.g., from a smartphone or smart home system in communication with the time-passage indicator). The present devices can be subsequently unlocked by various methods, such as by tapping a predetermined sequence on the touch region, such as a code consisting of a series of numbers, or from a smartphone where a code may be entered, or a particular smartphone is previously enabled on an app to have the capability to lock and unlock the device.

In some embodiments, the present time-passage indicator device can contain other sensors that enable it to interact with (e.g., react to, or change its settings based on) its environment. For example, the device may have various accelerometer and/or gyrometer sensors that may be used for interactive setting. An example of using accelerometer and/or gyrometer sensing is the user shaking the device in order to indicate undoing the last entered changes in settings. The present devices can also contain motion sensors that allow the device to sense when a user is nearby and change a setting based on the proximity of a user. For example, a device can contain a motion sensor, and if the motion sensor does not detect any users nearby, then it could dim its light elements to conserve battery power, and then when a user is detected by the motion sensor the device can increase the light element intensities. A sensor, such as the accelerometer, gyrometer, and/or motion sensor, can be used to lock or unlock the device, or to turn the device on or off, in some embodiments. The device may also include a light sensor, such that for example the intensity of illumination may be adjusted generally automatically based on a detected ambient light level.

A configuration of sensors may also be utilized to prevent unwanted use, such as movement of the device to a new location, such as from a conference room to a worker's desk, or theft. A sensor such as an accelerometer may be used to detect motion, and after a preset interval of time, locks the device from any further interactions, such as turning off the touch sensor and/or interactions with other devices (e.g., with a smart assistant such as Alexa). The device may then be unlocked by various methods, such as by tapping a predetermined sequence on the touch region, such as a code consisting of a series of numbers, or from a smartphone where a code may be entered, or a particular smartphone is previously enabled on an app to have the capability to unlock the device. An interval of time may be chosen as sufficiently short to allow repositioning within a room, such as 3 seconds or 10 seconds. In some embodiments, a sound indicating the unwanted use may be emitted, such as a siren-type sound.

A touch interaction may also indicate an "undo", such as by swiping back and forth repeatedly as if rubbing out an entry. In another example, a setting may be recalled by specific set of touches, such as by swiping counterclockwise on a circular device. This method may be considered an undo mode.

The touch sensors may use electrically conducting transparent films, such as indium tin oxide (ITO) or any other transparent conductor (e.g., other transparent conducting oxides, a transparent conductive coating of carbon nanowires, or metal nanowires), on a plastic sheet that may be disposed in proximity to a surface of the window, such as on a surface opposite to that of the outer touchable surface.

The structure of the present time-passage indicator devices may have various sizes, geometries, and profiles. In some embodiments, the device is able to sit in the palm of a hand, such that the device is easily transportable. For a device that is a circle, a diameter may be about 3 inches, about 4 inches, about 6 inches, about 12 inches, or from about 1 inch to about 12 inches. For a linear device, the length may be about 3 inches, about 4 inches, about 6 inches, about 12 inches, or from about 1 inch to about 12 inches. Both smaller and larger devices are conceived and may have different utility. Smaller devices may be wearable or pocket-sized. It may also be that a circular device of about 1 inch diameter is sufficient to indicate time on a desk or a wearable device such as a device worn on a wrist, or incorporated into other devices with pre-existing functions, such as a watch. Larger sizes may be preferred for conference tables, such as circular devices with diameters larger than about 3 inches, or from about 3 inches to about 6 inches. Yet larger devices such as from about 6 inches to about 12 inches in diameter may be preferred for wall mounted devices. Linear devices may also have a width, such as about 1 inch, about 2 inches, about 3 inches, about 4 inches or about 6 inches, or from about 1 inch to about 6 inches in width. For example, a wall-mounted device may be about 3 inches wide by about 12 inches long. In some embodiments, the present time-passage indicators can be even larger, for example have a length or diameter from about 1 foot to about 10 feet, or from about 1 foot to about 4 feet, or about 1 foot, about 2 feet, about 4 feet, about 6 feet, or about 10 feet (in length or in diameter). For example, larger devices may be preferable in sports arenas, such as those 4 feet long or in diameter.

The geometry of the device, as viewed from above, may be linear (where linear indicates a straight line), rectangular, round, annular shaped, an arcuate segment, an annular shaped arcuate segment, or other shape. Other shapes may include a triangle, such as where time progresses from initially illuminating one side of the triangle to finally illuminating a vertex of the triangle opposite the first side. In general, the device disclosed presents a surface that possesses regions that are sequentially illuminated.

Figure 7A:
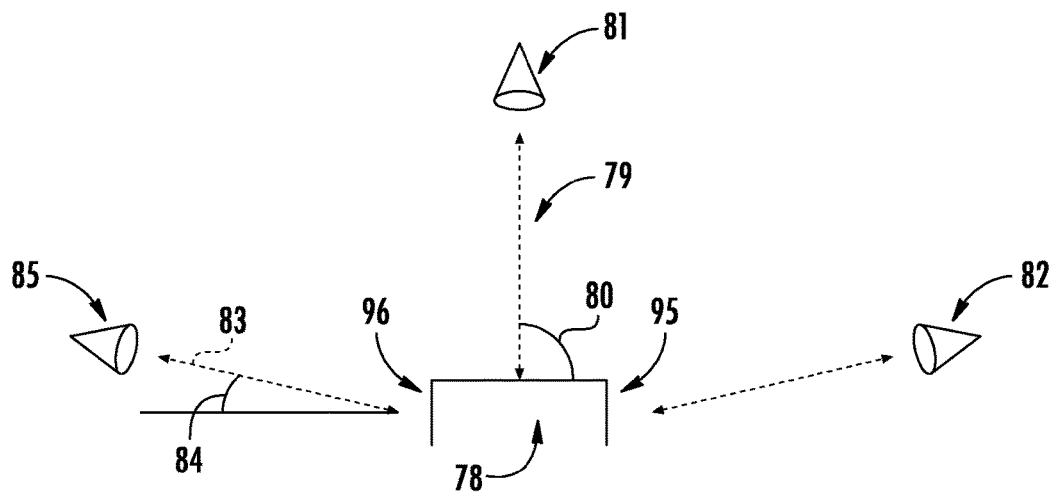
FIG. 7A shows an example of a portion of a present time-passage indicator, viewed in cross-section, in accordance with some embodiments.

The profile of the device may be preferably one that allows a user to see the illumination from multiple angles. FIG. 7A shows an example of a portion of a present time-passage indicator, viewed in cross-section, containing a window 78 that is rectangular in cross-section. The direction 79 normal to the top surface of window 78 is also shown in the figure. The direction 79 (and direction 3b in FIG. 1C) can be described as a "normal viewing angle." In cases where the window is curved, then the direction 79 can be still be described as a "normal viewing angle," or normal to a plane at the base of the housing, or normal to a major plane of the window, or normal to a major plane of the device, all of which refer to a direction equivalent to direction 79 in FIG. 7A. The light elements (not shown) are under the window 78 and emit light through the window 78 such that the light is viewable by a user, for example where the user's eye is at location 81, 82 or 83. The window 78 forms a light-emitting surface of the device, and this light emitting surface may be viewed at an angle 80 perpendicular to the top of the window (i.e., in normal direction 79) at a viewing position 81. The window 78 also has side surfaces 95 and 96. A user at a position 85 can view the device (looking in direction 83) from low angle 84. Similarly, a user at a position 82 can view the device from a low angle about the same as angle 84. The minimum viewing angle (e.g., angle 84) may be zero for certain devices such as a bar, or as low as 1°, or 5°, or 10°, or 20°, less than 1°, less than 5°, or less than 10°, for some device geometries (e.g., if the device is a ring then the side of the ring farthest from the viewer may be viewed at a low angle that is greater than 0°). For example, the minimum viewing angle (e.g., angle 84) can be from about 0° to about 20°, from about 0° to about 10°, from about 1° to about 20°, from about 5° to about 20°, from about 10° to about 20°, at about 10°, at about 20°. In some embodiments, the illuminated region is viewable from all angles between 10° and 90°, where the angle of 90° corresponds to a viewing angle normal to the window at a central point on the window outer surface.

Figure 7B:
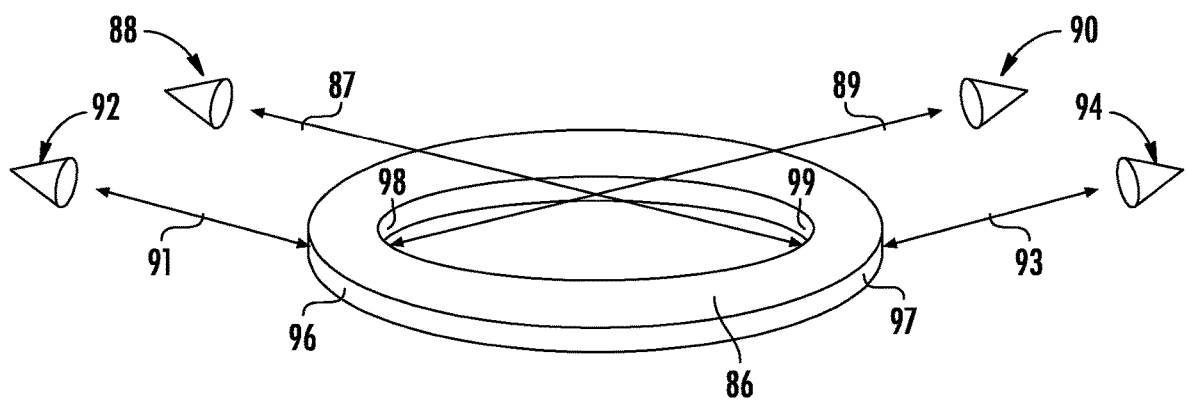
FIG. 7B shows an example of a circular time-passage indicator device, in perspective view, that may be viewable from different positions, in accordance with some embodiments.

FIG. 7B shows an example of a circular time-passage indicator device 86 that may be viewable from nearest side 96 or 97 to viewing positions 92 and 94, respectively, in directions 91 and 93, respectively. The sides 99 and 98 farthest from viewing positions 88 and 90, respectively, in directions 87 and 89, respectively, may also be viewed. A minimum viewing angle can be defined as an angle measured from the base (i.e., the plane of the base surface) of the housing of the device, similar to the angle 1025 shown in FIG. 1C. In some embodiments, the minimum viewing angle for the near side of the device is smaller than that of the far side of the device. In some embodiments, the minimum viewing angle for viewing the near side of the device (e.g., angle 84) or for viewing the far side of a device (e.g., viewing positions 88 and 90 viewing sides 99 and 98, respectively, in FIG. 7B) can be from about 0° to about 20°, from about 0° to about 10°, from about 10° to about 20°, at about 10°, at about 20°, greater than 1°, greater than 2°, greater than 5°, greater than 10°, or greater than 20°.

Figure 7C:
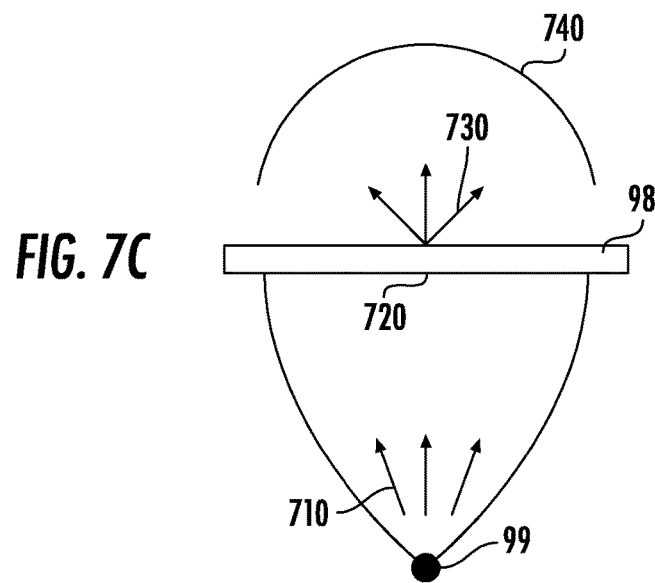
FIG. 7C shows a window and a light element that is emitting light onto the window at a point on the inside surface of the window, in cross-section view, in accordance with some embodiments.

In some embodiments, the window of the present time-passage indicator devices is light dispersing, which improves the possible viewing angles of the device. FIG. 7C shows a window 98 and a light element 99 that is emitting light 710 onto window 98 at a point 720 on the inside surface of the window. The window 98 is light dispersing such that light 710 impinging on the surface at point 720 emits light from the surface in multiple directions 730, where these directions are generally distributed over hemisphere 740 above point 720. In some cases, the light can be uniformly or smoothly distributed over hemisphere 740, and in other cases, the light has a non-uniform distribution over hemisphere 740 (e.g., where the light is brightest at a point on hemisphere 740 that is normal of the window surface and the intensity is reduced slight away from the normal direction).

In some embodiments, the profile of the outer surface of the window through which the illuminated region is viewed is such that at least one region of the device is generally perpendicular the viewer's line of site, to allow what may be considered direct viewing. A device window may have a profile (i.e., a shape of the window when viewed in cross-section) wherein the illumination surface (i.e., outer surface of the window) is generally planar and parallel to a surface such as a table, and viewing may be possible at an angle to the surface of the device if that surface is sufficiently light dispersing, such as via a frosted surface of a clear window, or a white colored window. Profiles that allow for direct viewing can be planar (e.g., rectangular or triangular) or curved (e.g., semicircular, or parabolic), and direct viewing profiles may be rectilinear or arcuate. A window profile (or cross section of a light-emitting segment) in a linear or circular device may be configured such that direct viewing is possible from multiple sides and multiple angles including the low angles discussed above. It is advantageous that the present time-passage indicator (i.e., time displaying) device is viewable from multiple positions and angles, where, for example, when the device is on a planar surface such as a table it is viewable from all points on a hemisphere above the table. In some cases, the device is viewable from all points of a hemisphere above the table except those points below a minimum angle, where the minimum angle is a small angle as described above (e.g., with reference to FIGS. 7A and 7B, or element 84 in FIG. 7A).

Additionally, the present time-passage indicator devices can have sufficient brightness to enable the device to be easily viewable at a distance, such as across a table at a distance of 4 feet, or 6 feet, or more. This is distinguished from an LCD display which is typically not bright enough to be viewed at long distances.

In some embodiments, the illumination of the illuminated region is such that there is a smooth transition from illuminated to dark regions. For example, light from one light element can illuminate a primary segment associated with that light element, and also can partially illuminate adjacent segments. In other embodiments, the illumination is contained in a segment of the illuminated region such that the illuminated and dark regions are generally sharply delineated. For example, this can be achieved by having generally opaque or minimally transmissive or reflective barriers (or baffles) between the light sources within the device to prevent light from a light element from illuminating adjacent segments.

In some embodiments, a present time-passage indicator device can include multiple simultaneous timers. Several embodiments and examples of such devices are described below.

In some cases, there can be more than one timer displayed concurrently, using one or more illuminated regions to represent each timer. In other cases, the device can switch from one timer to another, where more than one timer is running but only one timer is displayed at a time. For example, a round timer can use multiple illuminated regions to represent two timers (e.g., a 10 minute timer and a 20 minute timer) concurrently, where one illuminated region starts at the 12 position (i.e., the top of the device, e.g., as shown in FIG. 2A element 21) and a second illuminated region starts at the 6 position (i.e., the bottom of the timer, e.g., as shown in FIG. 2A element 19). In some embodiments, a timer may be represented by a single or a plurality of segments of an illuminated region, such that multiple timers may be indicated without overlap. If such timers overlap, other indications may occur such as rotating the colors of a segment in which overlap occurs.

In another example, multiple simultaneous timers can be concurrently displayed using multiple rings with different radii (in circular devices) or multiple lines (in linear devices) of illuminated regions. For example, multiple concentric rings of lights may be utilized such that an individual timer is displayed on one ring and another timer on another adjacent ring.

In other cases, the timers can alternate, for example, multiple timers may be displayed by alternating a region of illumination corresponding to each timer. To distinguish between the different timers, each timer may have different colors. In other cases, the timers may be displayed by interleaving the segments of the different timers. For example, one timer can be red and alternate segments are illuminated red, and a second timer is green and the segments between the red segments may be illuminated green.

In some embodiments, multiple tasks within a total time period (or total duration) can be shown by the present time-passage indicators. In some embodiments, the illuminated region is split into sections, where each section corresponds to a task. In some embodiments, the present devices display time moving between different tasks within a set time period, by changing the color of the segments of the illuminated region in each section (i.e., in each region associated with each task). For example, in a 45 minute time period, a first 15 minute section of segments can be illuminated in one color, and then at 15 minutes as the timer progresses, the color may change to a second color, and then at 30 minutes, the timer changes to a third color. In some cases, the different sections of the illuminated region will display as different colors and they will not change color over time. For example, in count up mode, the timer would start one color, and then once the next section was entered it would be a different color, and the first section would remain its original color. In other cases, the sections of the timer can be different from one another and/or change over time. For example, the entire illuminated region could change color every time a new section was entered. In some embodiments, multiple timers may be set by various input methods simultaneously to run sequentially, wherein only one timer is displayed at a time. For example a 15 minute and a 30 minute timer may be set at once and then the 15 minute timer progresses through its time passage indication and when complete the 30 minute timer progresses through its time passage indication sequence.

In some embodiments, the present time-passage indicators can utilize wireless charging systems, such that the timer is set upon a pad-type charging unit to charge without a wire connected to the device, such as by a plug. In some cases, a Qi system can be used. Battery status can be indicated by a displayed region of lights on the device, or on a user interface on a separate electronic device in communication with the time-passage indicator. In some cases, battery status can be viewed by activating a button or by a specific pre-determined touch interaction. In some cases, battery status can be viewed automatically at a predetermined level of battery, such as 20% of charge remaining. For example, once the battery reaches less than 20% charge, lights on the device (e.g., dedicated battery status lights, or segments within the illuminated region) flash red, intermittently. In some cases, the light elements may have a low-battery or battery charge state display mode (e.g., when the battery is below a certain threshold the light elements may dim to conserve battery power).

In some embodiments, the present time-passage indicators can comprise a user input element that is a rotating knob. Rotating the knob may have the effect of moving the lights on the timer to indicate where the knob is being set to. There may be a time delay after releasing the knob at which point the display changes from the setting to timing. The knob may have multiple functions such as a push button that can be used for other timer interactions. The mechanical input element may also be a slider, or other element with sliding means.

In some embodiments, the present time-passage indicator devices can contain an on/off button. For example, to save power, the unit may have an on-off button or switch. An alternate mode is a standby mode wherein the lights are off but the circuitry including the central processing unit is still active and awaiting input from a user input element or a sensor (e.g., a touch sensor, an accelerometer, or a motion sensor).

In some embodiments, the present time-passage indicator devices can contain an auto-lock. For a device with a touch sensor display, it is desirable to avoid inadvertently setting the device after it has been set. Thus the unit may have a mode wherein further setting is disabled until certain action is taken. The lock-out mode may be automatically entered within a set period of time (e.g., 3 seconds) after the timer is set, or by a specific action such as double tapping the timer after setting. Exiting lock mode may be accomplished by a specific action, such as a double tap.

In some embodiments, the unit may have a region proximal to the light emitting region and the window of the device that may be soft to absorb impact and may extend beyond the window, e.g., as a bumper, guard rail, or guard ring.

In some embodiments the window of the device and/or the light emitting surface may incorporate printing. The printing may be numbers to indicate time, such as 5, 10, 15 . . . etc. The printing may be generally opaque regions such as black lines to help delineate between illuminated segments. The unit may incorporate a single marking indicating at least one position, such as the 12 position on a round device.

Additionally, any of the markings mentioned above can be elements of the device such as raised or recessed regions, or may be printed.

In some embodiments, the unit has a means to attach to a means with numbers, such as a flat disc that has a full printed clock on its surface to help children who do not have facility with the numbers on a clock. For example, a transparent sheet with numbers or other information printed on it can be fitted with holes, and the holes can fit onto a series of raised pegs on the device to align the marked sheet with the illuminate region of the device.

In some embodiments, the unit has provisions for mounting on a wall such as via magnets or a recessed region to allow for a hook or screw.

In some embodiments, the timer may incorporate a sound emitting means. The sound emitted may be a corollary of any of the time-keeping functions, such as a warning that time is close to completion, or time has completed, or timing has initiated. A sound can also indicate a low battery warning.

In some embodiments, a battery may be contained in a removable section. The removable section may have a mating plug system with the section it is removed from. The removable section may have means for affixing it such as via magnets or other mechanically interacting means and may have mating features to ensure alignment.

In some embodiments, the present time-passage indicators may include a light transmissive means, hereafter called a window, and a circuit board that contains a processor and light elements that emit light onto and through the window, and a touch sensor. The window may be of a material such as plastic, and may have regions on the inner surface (i.e., facing the light elements) coated with a generally electrically conductive and transparent material such as ITO. The ITO is disposed in electrically-isolated regions so as to form local touch contact regions or pads (i.e., touch elements). Contact is made from these touch regions to the circuit board and circuitry on the circuit board (e.g., including the processor) can translate the touch into a user input. In some embodiments, clips are mounted to the circuit board such that when the window is put in place in the device, a surface of ITO slides into the clip. A single clip or more can be used for each region of ITO. The clips mounted to the circuit board are electrically connected to the touch sensor sensing circuitry on the circuit board.

An alternate method is to have a region of the window that is coated with ITO and is parallel to the circuit board, for example, in the shape of a finger. The circuit board may then have an exposed region of metal forming a contact pad. The assembly has a means to compress a finger of the window onto a contact pad. The window may have angled regions to smoothly make transitions between the touch region and the contact finger, such that deposition of ITO from a single incident direction may result in a continuous and electrically continuous ITO region.

In some embodiments, the means for compressing the fingers on the contact pad may be an O-ring that is disposed to contact a complete circle of fingers, and a rigid circular means that when fastened to the circuit board compresses the O-ring which compresses the fingers onto the circuit board and making electrical contact between the touch elements and the circuit board circuitry.

Figure 8A:
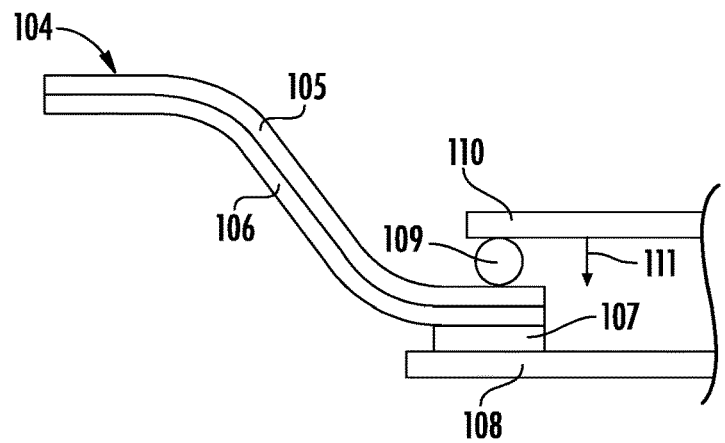
FIG. 8A shows an example of a means for electrically connecting contact pads to circuitry on a circuit board, in cross-section view, in accordance with some embodiments.
Figure 8B:
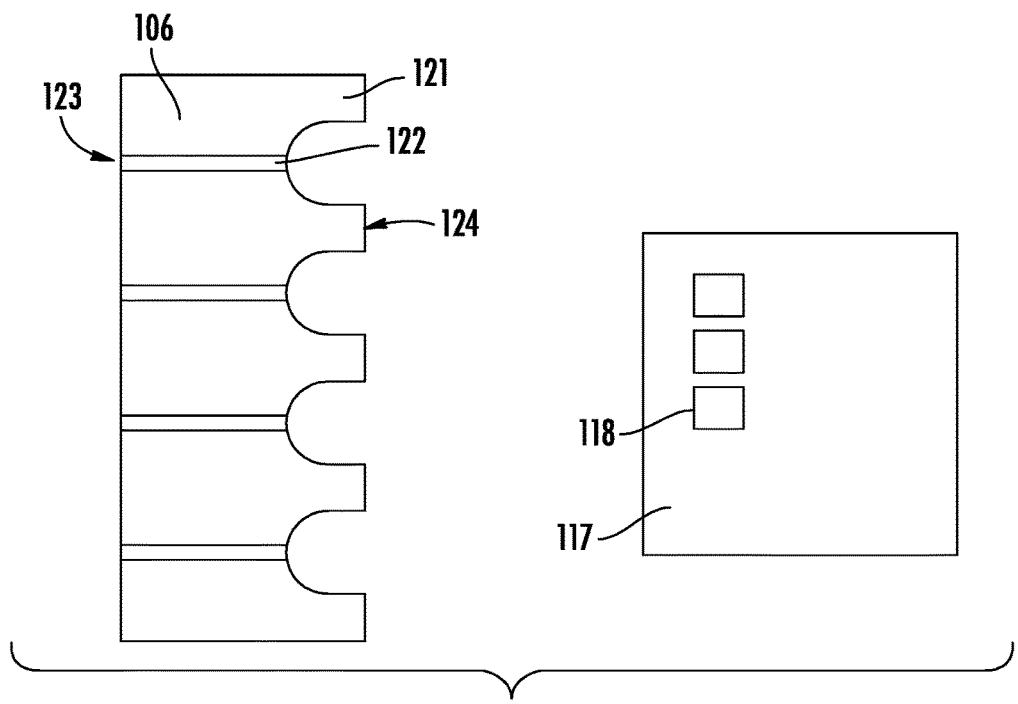
FIG. 8B shows the window from FIG. 8A from the bottom, and the electrically conducting layer from FIG. 8A, in accordance with some embodiments.
Figure 8C:
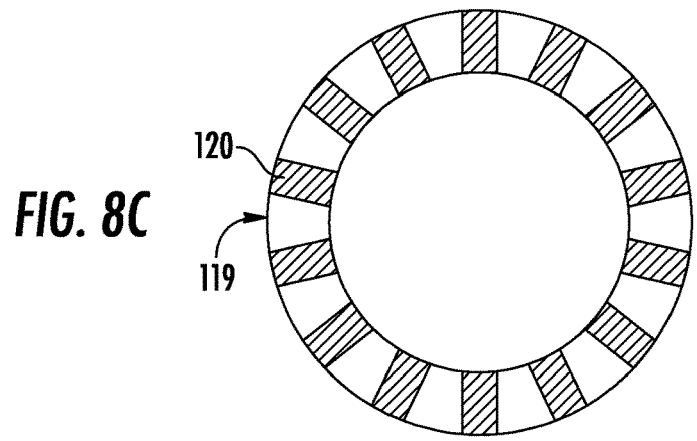
FIG. 8C shows an example of a circuit board for a circular device with pads, in a top view, in accordance with some embodiments.
Figure 8D:
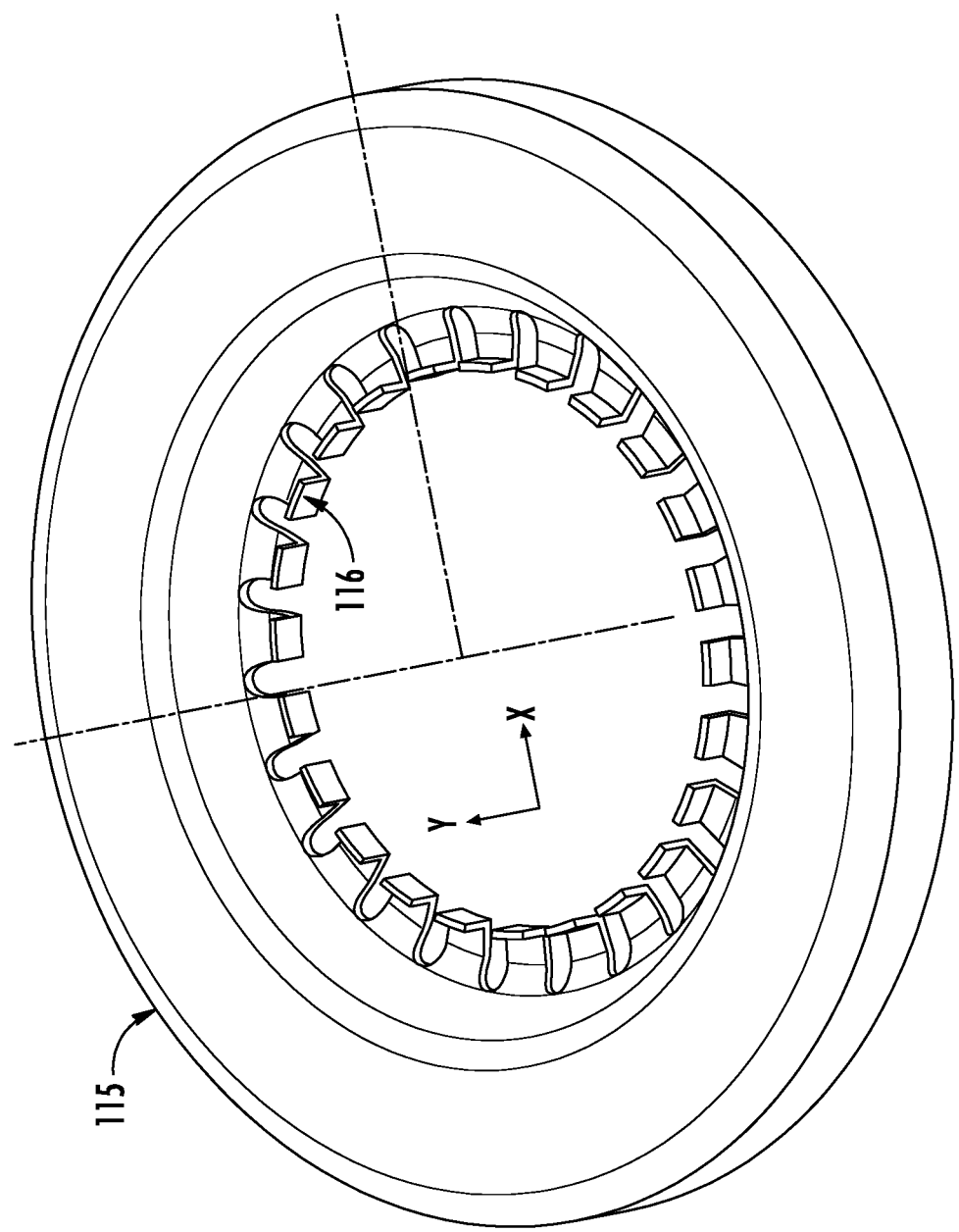
FIGS. 8D-8E shows an example window, in perspective view, in accordance with some embodiments.
Figure 8E:
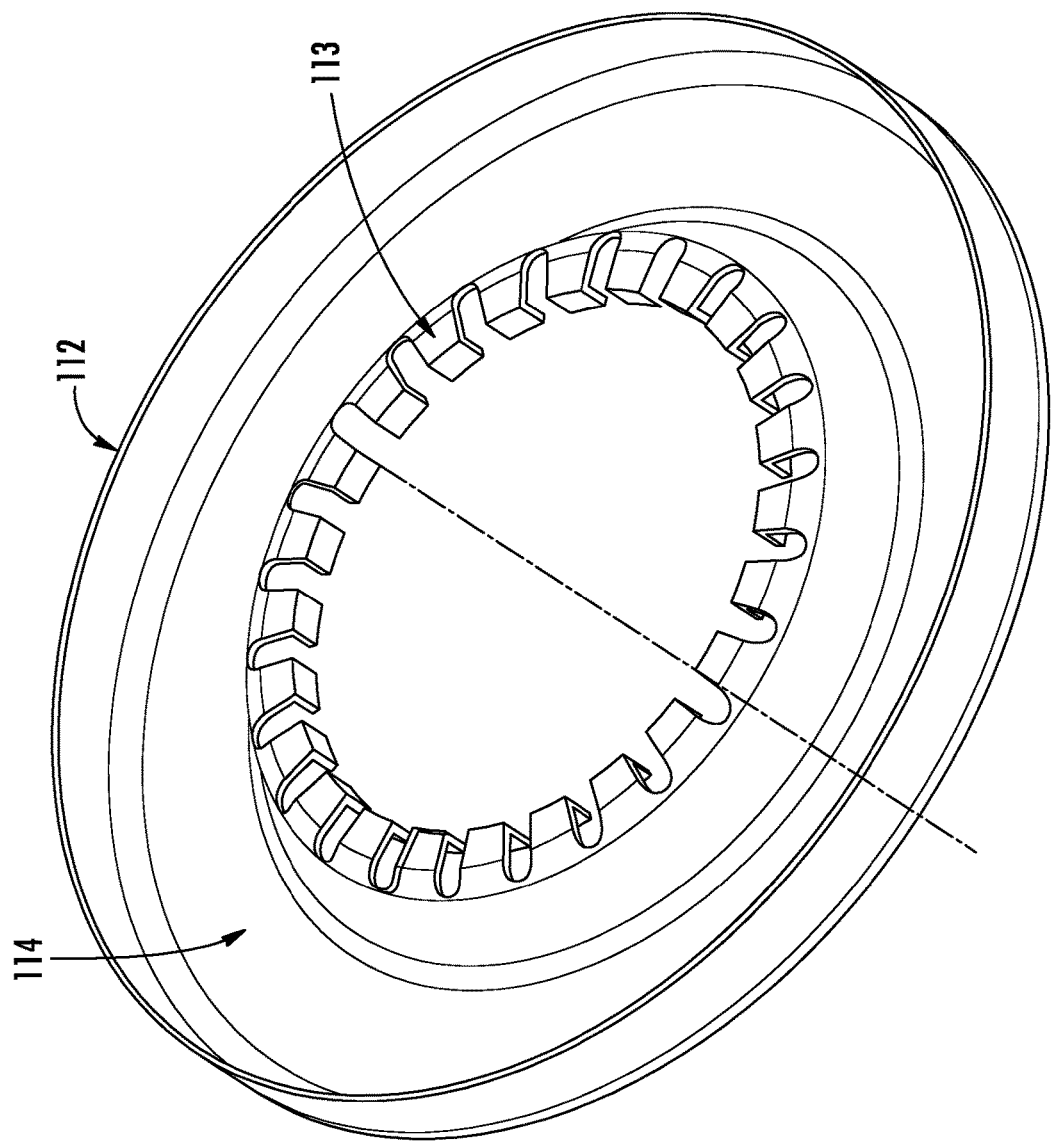

FIG. 8A shows an example of a means for electrically connecting contact pads to circuitry on a circuit board. The window (or light emitting surface) 104 is composed of a light transmissive and structurally stable means 105 and an electrically conducting and transparent layer 106 (e.g., where 106 is a portion of a touch sensor or touch element). In this example, the surface 104 has a generally smooth contour without sharp corners such that the coating 106 is electrically continuous. The circuit board 108 possesses an electrical contact pad 107. In this example, the means for compressing the layer 106 against the pad 107 is an O-ring 109 that is compressed in the direction 111 by a rigid structure 110. The structure 110 applies a downward force on the O-ring (in the direction of 111) to effect a low-resistance path from the surface 106 (and the touch sensor or touch element) to the pad 107 (on the circuit board). FIG. 8B shows the window 106 from the bottom, so that the surface 123 is the inner surface of the window (facing the light elements). In FIG. 8B, the electrically conducting layer 106 is discontinuous between emission segments 121 with an electrically insulating region 122 between segments, such that fingers 124 may contact individual contact pads 118 on a circuit board 117. FIG. 8C shows an example of a circuit board 119 for a circular device with pads 120. FIG. 8D shows an example window in perspective view, with an outer surface 115 and fingers 116 arranged to enable contacting pads 120 in FIG. 8C. FIG. 8E shows the window from FIG. 8D, in perspective view, from the other side such that inner surface 114 is visible with electrically conducting surfaces on a finger 113. The finger 113 can make contact with the pads 120 on the circular circuit board in FIG. 8C.

Figure 9A:
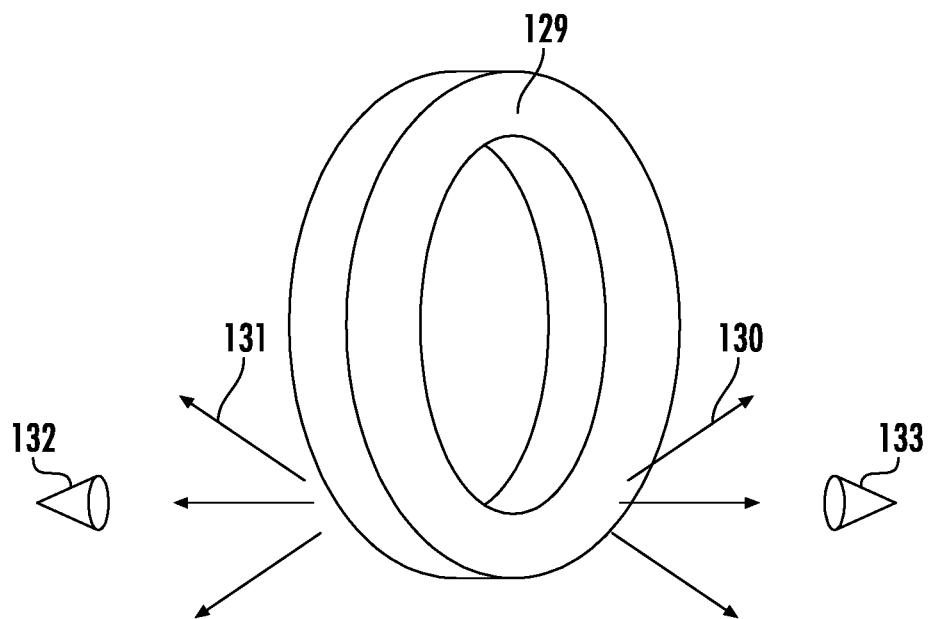
FIGS. 9A and 9B show an example of a time-passage indicator device, in perspective view and side view, respectively, in accordance with some embodiments.
Figure 9B:
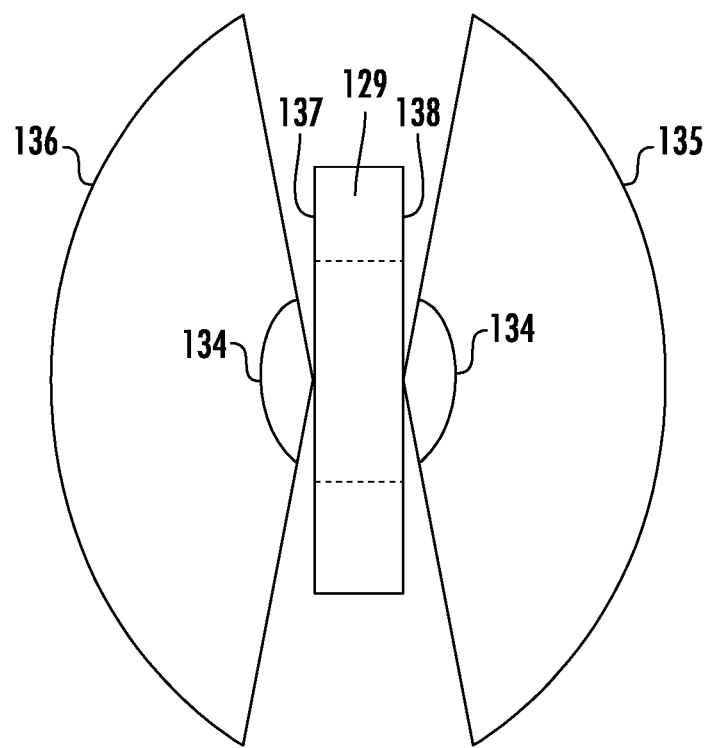

FIGS. 9A and 9B show an example of a time-passage indicator device 129, in perspective view and side view, respectively, that possesses window surfaces such that light is emitted from all surfaces, or at least from two opposing surfaces 137 and 138 (e.g., in directions 130 and 131) such that the device may be viewed from angles in a full circle or sphere (or nearly a full circle or sphere). For example, the illuminated region(s) can be viewable from positions 132 and 133, which are on opposite sides of the device. FIG. 9B shows a side view of device 129, and shows that there are possible viewing positions 135 and 136 over solid angles 134. This may be useful for a timing device such as a shot clock in a basketball game, where a device 129 would be placed above the back board at either end of the court, where a shot clock generally is positioned, such that the light emitting surface is viewable from any position on the court, as well and from behind the basket by the spectators.

In some embodiments, the present time-passage indicators utilize artificial intelligence (AI) and/or machine learning (ML) to predict device usage and/or settings, for example, by recording the activities of one or more users and using the information to make future predictions about device usage and/or settings. For example, a present device can record a user's settings preferences over a period of time (e.g., over a time period from 1 day to 1 year, or over a period of 1 day, 1 week, 1 month, a quarter of a year, a full year, more than a year, or over any time period within those ranges) in order to predict what preferences a particular user is likely to use, and then use those settings as default settings when the user sets the device in future instances. In another example, a present device can predict usage (e.g., when the device will be set, for how long, etc.) based on past usage of one or more users. The predictions can be based on the particular user setting the device, the time of day, the day of the week, the day of the year, the location of the device, or any other contextual information. The information determined by the AI and/or ML program may be advantageously shared with other people via electronic and software methods (e.g., using an app). For example, the information can be shared with friends in order that the friends can know the best times to interact (e.g., by texting) with the person sharing the information gathered from their time-passage indicator.

In some embodiments, a network of time-passage indicators comprises two or more time-passage indicators. For example, multiple devices can be connected such that all run in sync, or a user can change any one device and the same change will occur on all devices on the network. In some embodiments, there is a master time-passage indicator device and slave devices, where any change to the master will cause the slaves to change to match the master. The time-passage indicators on the network all communicate with each other, and can be set either remotely or directly through user input elements (e.g., a touch sensor). The time-passage indicators in the network may be in the same room or at other locations, such as a first device that is in a user's office and a second device that is at a user's home, or a group of devices at different locations in a single building or a single site with a cluster of buildings (e.g., a factory with multiple rooms and/or multiple buildings), in the same location in a city, in different locations in a city, or in different cities. In some embodiments parameters are passed between devices with a predetermined relationship between the devices such that the passed parameter is utilized differently on different devices, such as a brightness where one device may be predetermined to be brighter than the other devices, or a time set from a first device may be longer or shorter on a second device. For example, in a home a main time-passage indicator in a shared living space such as by the front door may be set for 30 minutes and the time-passage indicators in the bedrooms of the house are set for 20 minutes, where the predetermined relationship may be bedroom timers are set 10 minutes less than the front door timer.

In another embodiment, real-time information about the settings of a time-passage indicator may be shared with other people, such as via an app. For example, a first user with a time-passage indicator may share the current time passage setting, such as a total duration of 30 minutes or the amount remaining of such a setting, with another user via an app where the second user can view the passage of time set on the first user's time-passage indicator. Additional information about the activity related to the time passage, such as that the first user is in a meeting or that they are exercising, may also be shared with the second user or a group of pre-selected users.

Figure 10:
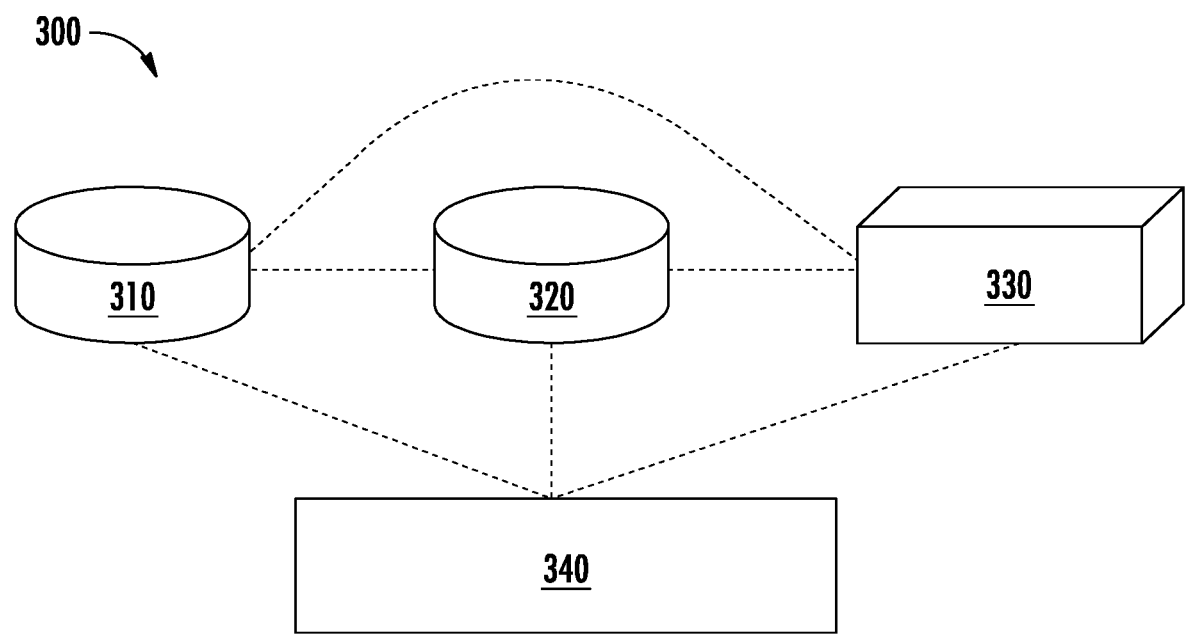
FIG. 10 shows an example schematic of a network of time-passage indicators, in accordance with some embodiments.

FIG. 10 shows an example schematic of a network 300 of time-passage indicators. Time-passage indicator 310 can be a present time-passage indicator, which can be in communication with a second time-passage indicator 320. The dashed lines in FIG. 10 represent communication between all of the devices in the network. The communication can be accomplished wirelessly using wireless electronics in each of the devices on the network, or the communication can be wired, in some cases. In some embodiments, the time-passage indicator can also be in communication with other electronic devices 330 in the network. For example, device 330 can be a computer, a television, a smart phone or tablet, or a digital assistant. In some cases, the present time-passage indicator 310 is in communication with a device 340 that can be used to remotely set the present time-passage indicator 310. For example, device 340 can be a remote control, a smart phone or tablet, a computer, or a smart building management system. In some embodiments, a first time-passage indicator may transmit its settings to a second time-passage indicator in the network when set by an input. In some cases, the second time-passage indicator can transmit settings back to the first time-passage indicator as well. This process may be extended to multiple wirelessly connected time-passage indicators.

In some embodiments, the present time-passage indicator device contains wireless communication electronics and is integrated into a network with other network connected devices. For example, the present time-passage indicator can be connected to a smart assistant.

The time-passage indicator may be set with information from a source such as a calendar. For example, a calendar stored on a smartphone may be used to set timers on the time-passage indicator in a predetermined manner. For example, the time-passage indicator may indicate the time from the end of one meeting on a calendar to the beginning of the next meeting, and then subsequently display the time passage for that meeting.

The time-passage indicators may be set by a wireless system or smart home system such as Alexa. The time-passage indicator would communicate wirelessly with the required components of the smart system. The smart system may store various settings, histories, or states of the time-passage indicator. A user may set the time-passage indicators by voice through the smart system, or smart home system. Individual time-passage indicators may be given unique names or a group name, such that a user may refer to specific or groups of time-passage indicators in voice commands, such as "Alexa, set Dan's thing to 20 minutes" where the word thing would generally be replaced by a brand name of the time-passage indicator or other descriptive word that is factory preset. A user may also indicate setting of a group of time-passage indicators, such as "Alexa, set all the things in the house to 20 minutes".

The time-passage indicator system may also have the capability of sharing its settings with other systems, such as to an app used by other users at remote locations. Such information may be utilized by other users for example to view the progress of a meeting in which they are not a participant. Information may also be gathered by a system, such as a cloud-based system, where such a cloud-based system may utilize artificial intelligence such as to determine patterns in a user's utilization of the time-passage indicator.

Embodiments of the disclosed invention have been referenced in detail, and one or more examples of the disclosed invention have also been illustrated in the accompanying figures. Each of the embodiments and examples herein have been provided to explain the present technology, not as limitations of the present technology. Furthermore, while particular embodiments of the invention have been described in detail, it will be appreciated that alterations to, variations of, and equivalents to these embodiments may be readily conceived of by those skilled in the art, upon attaining an understanding of the foregoing. For instance, features illustrated or described with respect to one embodiment may be used with another embodiment to yield an additional embodiment. It is intended that the present subject matter covers all such modifications and variations within the scope of the appended claims and their equivalents. Those of ordinary skill in the art may practice these and other modifications and variations to the present invention without departing from the scope of the present invention, which is more particularly set forth in the appended claims. Furthermore, the foregoing description is by way of example only, and is not intended to limit the invention, as will be appreciated by those of ordinary skill in the art.

What is claimed is:

1. A time-passage indicator, comprising:
    a housing comprising a base surface on one side and a second surface on an opposite side;
    a plurality of light elements coupled to the housing;
    a window comprising an inner surface and an outer surface, wherein the window is attached to the second surface of the housing and is configured to diffuse or scatter light emitted from the plurality of light elements; and
    a processor configured to control the plurality of light elements;
    wherein:
    the plurality of light elements is configured to emit the light through the window to form an illuminated region;
    the processor is configured to control the plurality of light elements such that the illuminated region changes to indicate a passage of time;
    a minimum viewing angle of the illuminated region is from 0 degrees to 20 degrees, where the minimum viewing angle of 0 degrees is measured from a plane of the base surface; and
    the processor is configured to control the plurality of light elements according to a timing mode that is selectable to be a fixed timing mode or a variable timing mode.

2. The time-passage indicator of claim 1, wherein:
    a starting size of the illuminated region corresponds to a duration of one hour in a count-down mode of the fixed timing mode;
    an ending size of the illuminated region corresponds to the duration of one hour in a count-up mode of the fixed timing mode;
    the starting size of the illuminated region corresponds to a variable duration in a count-down mode of the variable timing mode; and
    the ending size of the illuminated region corresponds to the variable duration in a count-up mode of the variable timing mode.

3. The time-passage indicator of claim 1, wherein the illuminated region comprises a plurality of illuminated segments configured to sequentially illuminate to indicate the passage of time.

4. The time-passage indicator of claim 3, further comprising baffles connected to the housing, wherein:
    a first light element of the plurality of light elements corresponds to a first illuminated segment; and
    the baffles are located in between individual light elements in the plurality of light elements to reduce an amount of light emitted from the first light element into illuminated segments of the plurality of illuminated segments that are adjacent to the first illuminated segment.

5. The time-passage indicator of claim 1, further comprising a touch sensor comprising an optically transmissive element located proximal to the inner surface or the outer surface of the window,
    wherein the illuminated region comprises a plurality of illuminated segments configured to sequentially illuminate to indicate the passage of time, and wherein the touch sensor comprises a plurality of touch elements that are aligned with the plurality of illuminated segments on the window.

6. The time-passage indicator of claim 5, wherein the processor is configured to control the plurality of light elements according to a timing mode that is selectable to be a fixed timing mode or a variable timing mode, and wherein the timing mode of operation is set by a user touching twice in rapid succession the outer surface of the window at a location having a touch element on the inner surface of the window.

7. The time-passage indicator of claim 5, wherein:
the processor is configured to control the plurality of light elements using a set of timer parameters including one or more of: a mode of operation, a total duration, a sub-duration, a start command, and a stop command; and
a signal from the touch sensor to the processor is configured to communicate a user input for a timer parameter of the set of timer parameters.

8. The time-passage indicator of claim 7, wherein the total duration is set by a user touching the window at a location of an illuminated segment of the plurality of illuminated segments corresponding to the total duration determined by the user.

9. The time-passage indicator of claim 1, further comprising wireless communication electronics that enable the processor to be programmed remotely.

10. The time-passage indicator of claim 9, wherein:
the processor is configured to control the plurality of light elements using a set of timer parameters including one or more of: a mode of operation, a total duration, a sub-duration, a start command, and a stop command;
the processor is configured to receive communications from a user input device; and
a timer parameter is set remotely based on the communications received by the processor from the user input device.

11. The time-passage indicator of claim 10, further comprising the user input device, wherein the user input device is selected from the group consisting of: a computer, a tablet, a smart phone, a remote control, and a smart building system.

12. The time-passage indicator of claim 1, wherein a cross-sectional shape of the window is a flat plane, a circle, an arc of a circle, a triangle, an oval or a section of an oval, a rectangle or a section of a rectangle, a triangle or a section of a triangle, or a curve that is a combination of any or all of these.

13. The time-passage indicator of claim 1, wherein the outer surface of the window is a hemisphere, a sphere, a section of a sphere, a cylinder, a half-cylinder, a section of a cylinder, a torus, a half torus where the torus is cut by a plane perpendicular to an axis of revolution, a rectangular prism, a section of a rectangular prism, a triangular prism, a section of a triangular prism, a toroidal surface of revolution of a triangle, an oval, a rectangle, or a shape consisting of curves and lines.

14. The time-passage indicator of claim 1, wherein the window protrudes from the housing.

15. The time-passage indicator of claim 14, wherein the window protrudes from the housing by more than 1/16 inches in a normal viewing direction, or in a direction perpendicular to the normal viewing direction.

16. The time-passage indicator of claim 1, wherein a cross-sectional shape of the window is a flat plane, a circle, an arc of a circle, a triangle, an oval or section of an oval, a rectangle or section of a rectangle, a triangle or section of a triangle, or a curve that is a combination of any or all of these.

17. A network of time-passage indicators, comprising two or more time-passage indicators, wherein:
a first time-passage indicator in the network of time-passage indicators comprises:
a housing comprising a base surface on one side and a second surface on an opposite side;
a plurality of light elements coupled to the housing;
a window comprising an inner and an outer surface, wherein the window is attached to the second surface of the housing and is configured to diffuse or scatter light from the plurality of light elements;
a processor that is configured to control the plurality of light elements; and
wired or wireless communication electronics;
wherein:
the plurality of light elements is configured to emit light through the window to form an illuminated region;
the processor is configured to control the plurality of light elements such that the illuminated region changes to indicate a passage of time;
a minimum viewing angle of the illuminated region is from 0 degrees to 20 degrees, where the minimum viewing angle of 0 degrees is measured from a plane of the base surface;
the processor is configured to control the plurality of light elements according to a timing mode that is selectable to be a fixed timing mode or a variable timing mode;
the processor of the first time-passage indicator is configured to communicate with a second time-passage indicator in the network of time-passage indicators using the wired or wireless communication electronics; and
the first time-passage indicator is configured to receive a user input that causes a first timer parameter to be set in the first time-passage indicator and a second timer parameter to be set in the second time-passage indicator.

18. The network of time-passage indicators of claim 17, wherein the first and second timer parameters include one or more of: a mode of operation, a brightness, a total duration, a sub-duration, a start command, and a stop command.

19. The network of time-passage indicators of claim 18, wherein:
the processor is configured to receive communications from a user input device using the wired or wireless communication electronics; and
the first timer parameter is set remotely based on the received communications from the user input device.

20. The network of time-passage indicators of claim 19, further comprising the user input device, wherein the user input device is selected from the group consisting of a computer, a tablet, a smart phone, a remote control, and a smart building system.

21. The network of time-passage indicators of claim 17, further comprising the second time-passage indicator.

* * * * *